US010358853B2

(12) United States Patent
Tomky

(10) Patent No.: US 10,358,853 B2
(45) Date of Patent: Jul. 23, 2019

(54) FRICTION HINGE

(71) Applicant: Microsoft Technology Licensing, LLC, Redmond, WA (US)

(72) Inventor: Brett Andrew Tomky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 15/093,526

(22) Filed: Apr. 7, 2016

(65) Prior Publication Data

US 2017/0292302 A1    Oct. 12, 2017

(51) Int. Cl.
| | | |
|---|---|---|
| *E05D 11/08* | (2006.01) | |
| *F16M 11/20* | (2006.01) | |
| *F16M 11/38* | (2006.01) | |
| *G06F 1/16* | (2006.01) | |
| *F16M 13/00* | (2006.01) | |
| *H04M 1/02* | (2006.01) | |
| *H04M 1/04* | (2006.01) | |

(52) U.S. Cl.
CPC .......... *E05D 11/082* (2013.01); *E05D 11/084* (2013.01); *F16M 11/2021* (2013.01); *F16M 11/38* (2013.01); *F16M 13/005* (2013.01); *G06F 1/1637* (2013.01); *G06F 1/1656* (2013.01); *G06F 1/1681* (2013.01); *E05D 2011/085* (2013.01); *E05Y 2900/606* (2013.01); *G06F 1/1616* (2013.01); *H04M 1/0216* (2013.01); *H04M 1/04* (2013.01)

(58) Field of Classification Search
CPC .......... E05D 11/082; E05D 11/084; E05D 2011/085; F16M 11/2021; F16M 11/38; F16M 13/005; G06F 1/1616; G06F 1/1637; G06F 1/1656; G06F 1/1681; E05Y 2900/606; H04M 1/0216; H04M 1/04; H05K 5/0226; Y10T 16/54038; Y10T 16/5387; Y10T 16/540255; Y10T 16/54024; Y10T 16/540243
USPC ..... 16/342, 303, 330, 324, 325; 361/679.27, 361/679.59; 248/351, 688, 917; 455/575.3; 379/433.13, 454
See application file for complete search history.

(56) References Cited

U.S. PATENT DOCUMENTS

| | | | |
|---|---|---|---|
| 6,125,509 A | 10/2000 | Hartigan et al. | |
| 7,177,144 B2 | 2/2007 | Ha et al. | |
| 9,310,848 B2* | 4/2016 | Fujino | G06F 1/1654 |
| 9,752,361 B2* | 9/2017 | Park | E05D 11/082 |
| 9,822,567 B1* | 11/2017 | Lin | E05D 11/06 |
| 9,964,998 B2* | 5/2018 | Park | E05D 11/10 |

(Continued)

FOREIGN PATENT DOCUMENTS

DE    102012108625 A1    3/2014

OTHER PUBLICATIONS

"International Search Report and Written Opinion Issued in PCT Application No. PCT/US2017/026182", dated Sep. 20, 2017, 18 Pages.

*Primary Examiner* — William L Miller
(74) *Attorney, Agent, or Firm* — Rainier Patents, P.S.

(57) ABSTRACT

A friction hinge is described. In at least some implementations, the described friction hinge enables a support component to be adjustably attached to an apparatus, such as a computing device. According to various implementations, a friction hinge includes different friction stages where movement of the hinge is based on different activity mechanisms.

20 Claims, 23 Drawing Sheets

(56) References Cited

U.S. PATENT DOCUMENTS

| | | | |
|---|---|---|---|
| 10,001,815 B1* | 6/2018 | Yao | G06F 1/1681 |
| 10,037,057 B2* | 7/2018 | Schafer | G06F 1/1681 |
| 10,066,429 B2* | 9/2018 | Park | E05D 1/04 |
| 2006/0133052 A1 | 6/2006 | Harmon et al. | |
| 2009/0178242 A1 | 7/2009 | Lin | |
| 2011/0031287 A1 | 2/2011 | Le Gette et al. | |
| 2014/0078654 A1 | 3/2014 | Uchiyama et al. | |
| 2014/0085814 A1 | 3/2014 | Kielland | |
| 2015/0092335 A1* | 4/2015 | Patrick | G06F 1/1681 |
| | | | 361/679.27 |
| 2015/0342067 A1 | 11/2015 | Gault et al. | |
| 2015/0362962 A1* | 12/2015 | Lee | G06F 1/1601 |
| | | | 361/679.21 |
| 2016/0090767 A1 | 3/2016 | Park et al. | |
| 2016/0369543 A1* | 12/2016 | Park | E05D 11/082 |
| 2017/0003719 A1* | 1/2017 | Siddiqui | E05D 1/04 |

* cited by examiner

FRICTION HINGE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A friction hinge is described. In at least some implementations, the described friction hinge enables a support component to be adjustably attached to an apparatus, such as a computing device. According to various implementations, a friction hinge includes different friction stages where movement of the hinge is based on different activity mechanisms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
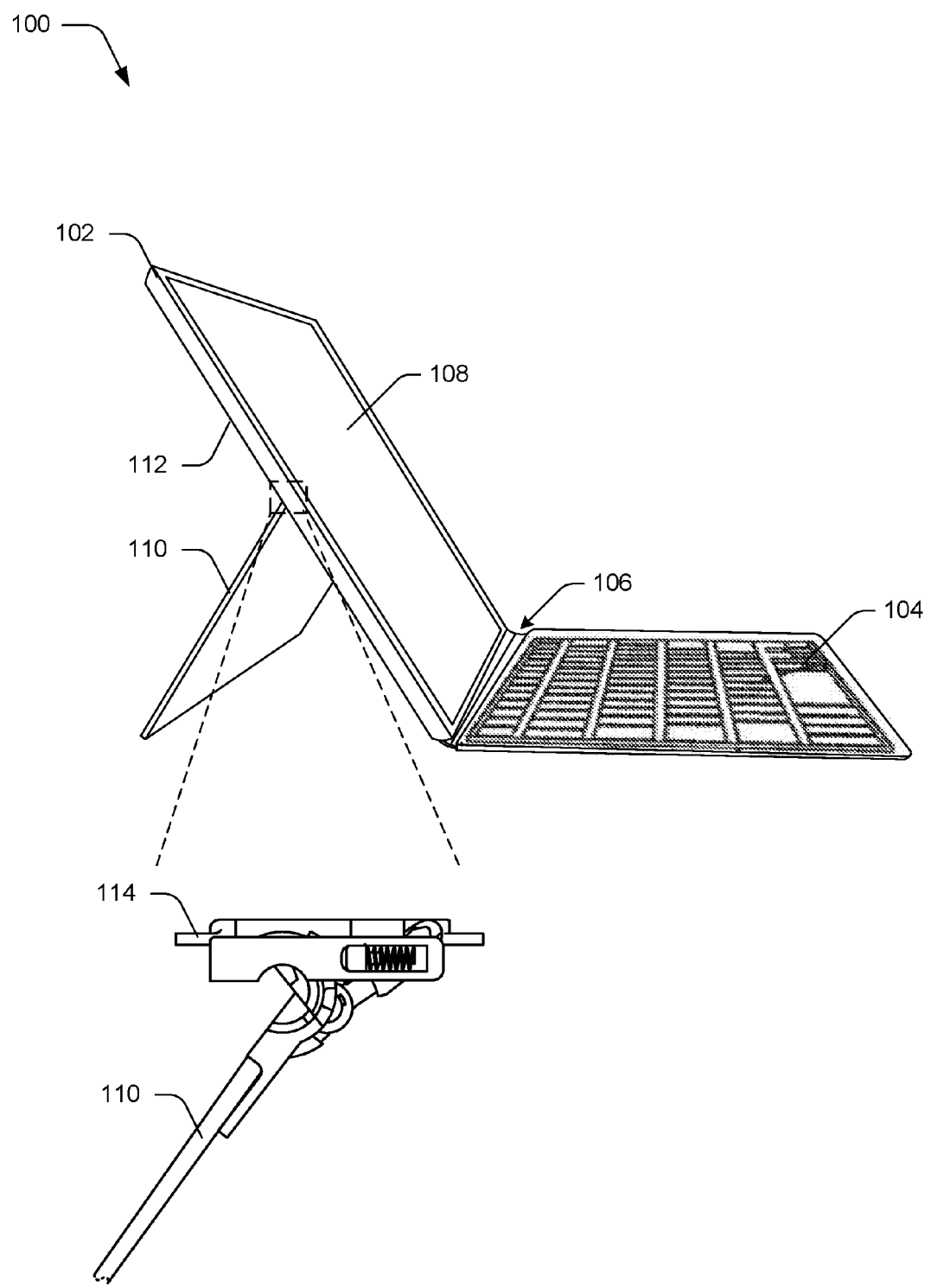
FIG. 1 is an illustration of an environment in an example implementation that is operable to employ the techniques described herein in accordance with one or more embodiments.

A friction hinge is described. In at least some implementations, the described friction hinge enables a support component to be adjustably attached to an apparatus, such as a computing device. For example, the friction hinge can be employed to rotatably attach a kickstand to a mobile computing device. The kickstand can be rotated via the friction hinge to various positions to provide support for different orientations of the computing device. This example is not intended to be limiting, however, and the described friction hinges can be used for hingeable attachment of a wide variety of different components to a wide variety of different apparatus.

According to various implementations, a friction hinge includes different friction stages where movement of the hinge is based on different activity mechanisms. For instance, the friction hinge includes first friction mechanism that provides frictional resistance to opening of the friction hinge over a first angle range. The hinge mechanism also includes a second friction mechanism that contributes frictional resistance to opening of the friction hinge over a second angle range. For instance, frictional resistance to opening of the friction hinge over the first angle range is primarily based on frictional forces provided by the first friction mechanism. Further, frictional resistance to opening of the friction hinge over the second angle range is based on frictional forces provided by both the first friction mechanism and additionally, the second friction mechanism. The second friction mechanism, for example, represents a "friction adder" that increases the torque required to open the friction hinge when transitioning from the first angle range to the second angle range.

Accordingly, implementations discussed herein provide a friction hinge that enables an attached component (e.g., a support component or "kickstand") to be adjusted between multiple positions. Further, the friction hinge includes multiple friction stages such that as the friction hinge opens, frictional resistance to further opening of the friction hinge increases. This enables the friction hinge and an attached support component to account for increases in gravitational forces that occur due to an increasingly shallow angle between the support component and an adjacent surface. Additionally, certain open angle ranges support different usage scenarios of an apparatus, such as user interaction with a computing device via touch input. Thus, increasing resistance to further opening of a support component enables an apparatus to maintain a desired position relative to an adjacent surface in these different usage scenarios.

In the following discussion, an example environment is first described that may employ the techniques described herein. Embodiments discussed herein are not limited to the example environment, and the example environment is not limited to embodiments discussed herein. Next, example device orientations are discussed in accordance with one or more embodiments. Following this, example hinges for support component attachment are discussed in accordance with one or more embodiments. Finally, an example system and device are discussed that may implement various techniques described herein.

Example Environment

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the computing device 102 may range from full resource devices with substantial memory and processor resources, to a low-resource device with limited memory and/or processing resources. An example implementation of the computing device 102 is discussed below with reference to FIG. 24.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

The computing device 102 further includes a display 108 and a support component 110. The display 108 is configured as a visual output functionality of the computing device 102. The support component 110 is rotatably and/or pivotably attached to a rear surface 112 of the computing device 102 via one or more instances of a friction hinge 114. For instance, the support component 110 is pivotable to different angles relative to the rear surface 112 to support different orientations of the computing device 102. An enlarged side view of the friction hinge 114 is presented here, and further attributes and implementations of the friction hinge 114 are detailed below. Consider now some example orientations of the computing device 102.

Example Device Orientations

Figure 2:
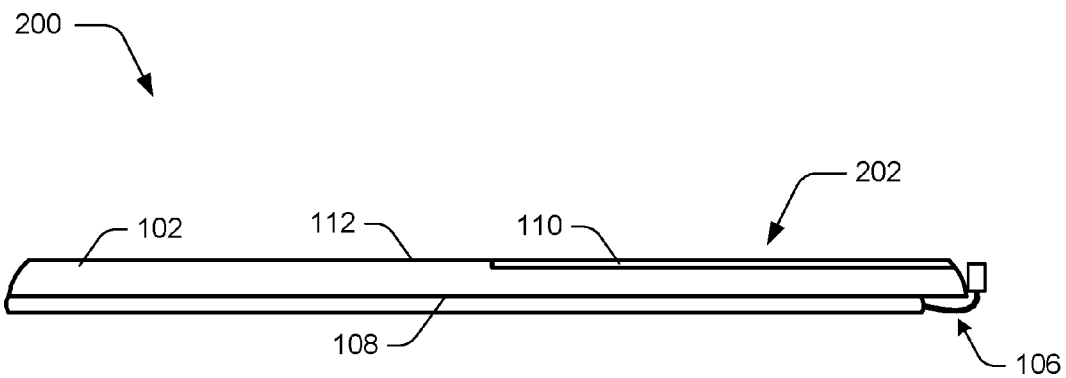
FIG. 2 illustrates an example orientation of an input device in relation to a computing device as covering a display device of the computing device in accordance with one or more embodiments.

According to various implementations, a variety of different orientations of the computing device 102 are enabled. For example, rotational movement may be supported by the flexible hinge 106 such that the input device 104 may be placed against the display 108 of the computing device 102 and thereby act as a cover as shown in FIG. 2. Generally, FIG. 2 shows the computing device 102 in an orientation 200 and the support component 110 in a position 202 relative to the rear surface 112 of the computing device. The position 202 generally represents a closed position for the support component 110. In the closed position, the support component 110 forms a portion of the rear surface 112 of the computing device 102 such that the support component 110 conforms to a surface contour of the computing device 102. For instance, when the support component 110 is in the closed position, the support component 110 integrates into the computing device 102 and does not protrude from a plane formed by the rear surface 112.

Figure 3:
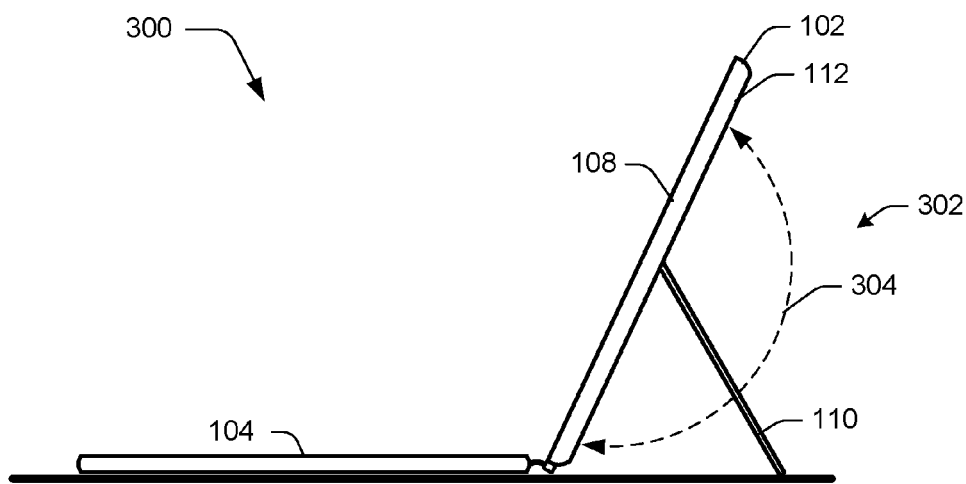
FIG. 3 illustrates an example orientation of an input device in relation to a computing device as assuming a typing orientation in accordance with one or more embodiments.

FIG. 3 depicts an orientation 300 of the computing device 102, which represents a typing arrangement. In this orientation, the input device 104 is laid flat against an adjacent surface (e.g., a table) and the support component 110 is opened to a position 302 to support the computing device 102 and permit viewing of the display 108. According to various implementations, the support component 110 can be employed to enable a variety of different orientations for the computing device 102, some of which are described herein. For instance, the friction hinge 114 introduced above enables the support component 110 to be pivoted to and supported at any discrete angle within an angle range 304 relative to the rear surface 112. Naturally, a variety of other orientations other than those expressly illustrated and discussed herein are also supported.

Figure 4:
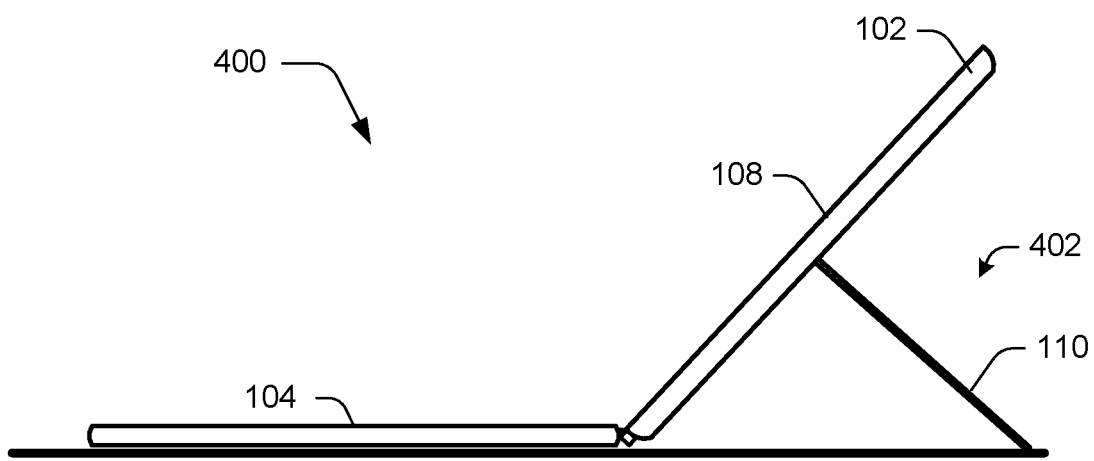
FIG. 4 illustrates an example orientation of a computing device with a support component in accordance with one or more embodiments.

FIG. 4 illustrates the computing device 102 in an orientation 400 in which the support component 110 is rotated further past the position 302 to a position 402. In the orientation 400, the computing device is reclined in comparison to previously-discussed orientations, such as the position 302. As illustrated, the position 402 presents the display 108 at a more open angle that supports different usage scenarios. For instance, the position 402 supports use of the computing device 102 in a user's lap, such as during air travel. A variety of other usage scenarios are supported by the position 402, such as for tall users that may have a higher viewing angle, use on a low surface (e.g., a coffee table), and so forth.

Figure 5:
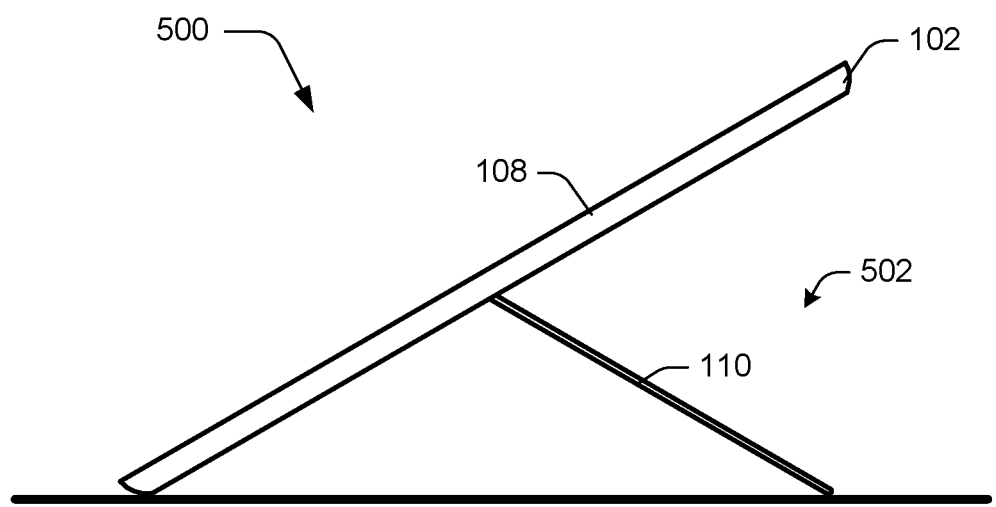
FIG. 5 illustrates an example orientation of a computing device with a support component in accordance with one or more embodiments.

FIG. 5 illustrates the computing device 102 in an orientation 500 in which the support component 110 is rotated further past the position 402 to a position 502. FIG. 5 also depicts that the input device 104 is detached from the computing device 102. As discussed above, the input device 104 is removably attached to the computing device 102 to support a variety of different usage scenarios.

Figure 6:
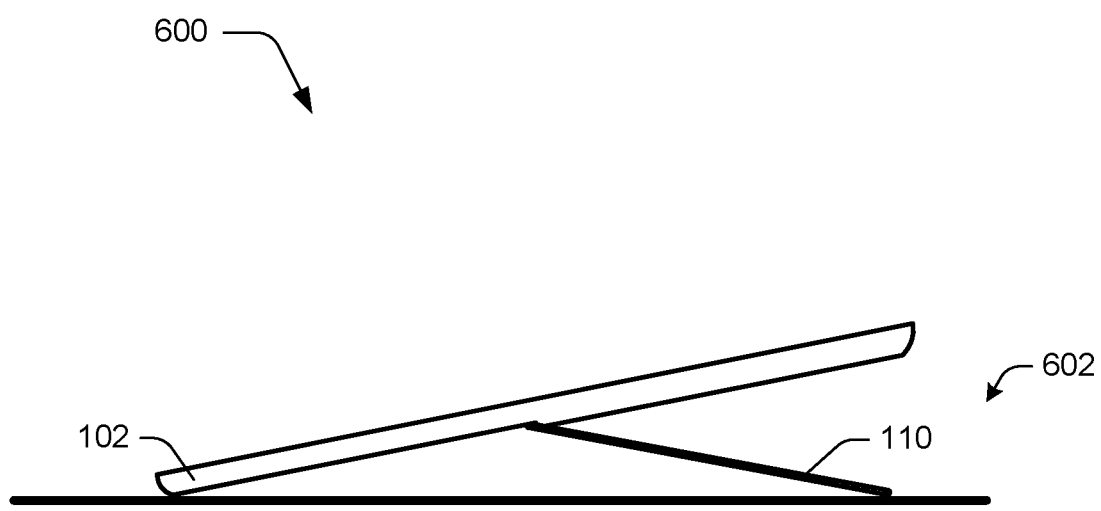
FIG. 6 illustrates an example orientation of a computing device with a support component in accordance with one or more embodiments.

FIG. 6 illustrates the computing device 102 in an orientation 600 in which the support component 110 is rotated further past the position 502 to a position 602. In at least some implementations, the position 602 represents a pre-specified maximum open position for the support component 110. For instance, opening the support component 110 further past the position 602 causes an emergency release scenario for the friction hinge 114.

In the various positions described above, the support component 110 is held in the particular positions via different friction-based interactions of the friction hinge 114, examples of which are detailed below.

Figure 7:
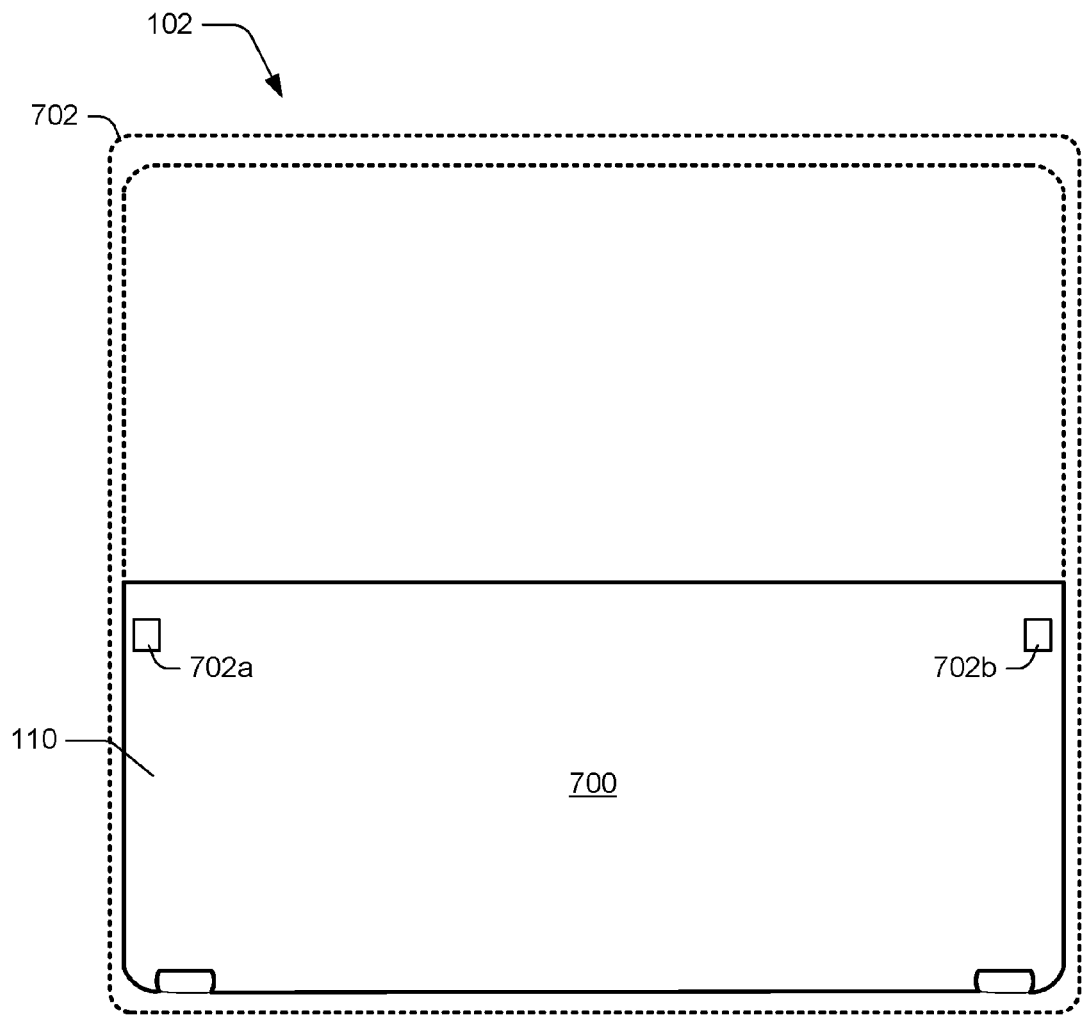
FIG. 7 illustrates an example inner surface of a support component in accordance with one or more embodiments.

FIG. 7 illustrates a view of an inner surface 700 of the support component 110 in accordance with one or more embodiments. In this example, the support component 110 is illustrated in the context of an outline of a chassis 702 of the computing device 102. The inner surface 700 includes hinge mounts 702a, 702b, which function as mounting points for hinge mechanisms that are employed to attach the support component 110 to the computing device 102. Examples of such hinge mechanisms are discussed below.

Hinges for Component Attachment

A variety of different hinge mechanisms can be employed for attaching various components in accordance with various embodiments. Some example hinge mechanisms and hinge arrangements are discussed below.

Figure 8:
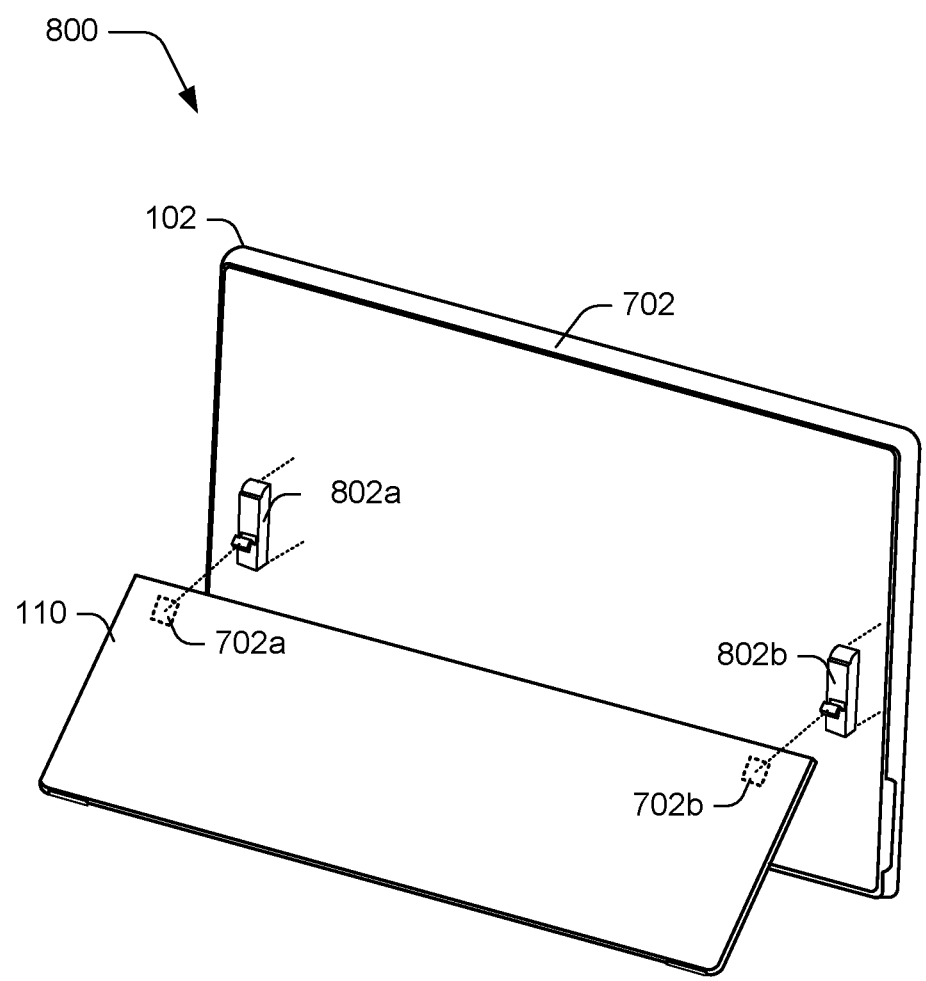
FIG. 8 illustrates an example exploded view of a computing device with a support component in accordance with one or more embodiments.

FIG. 8 depicts an exploded rear view 800 of the chassis 702 of the computing device 102 and the support component 110. Included in the rear view 800 are hinges 802a and 802b, which represent instances of the friction hinge 114. The hinges 802a, 802b are employed to attach the support component 110 to the computing device 102 and are configured to be installed internally in the computing device 102, such as via a suitable attachment method and/or device.

The support component 110 is attachable to a pivoting portion of the hinges 802a, 802b via the hinge mounts 702a, 702b introduced above. Thus, attachment to the hinges 802a, 802b enables the support component 110 to pivot between various positions relative to the computing device 102.

Figure 9:
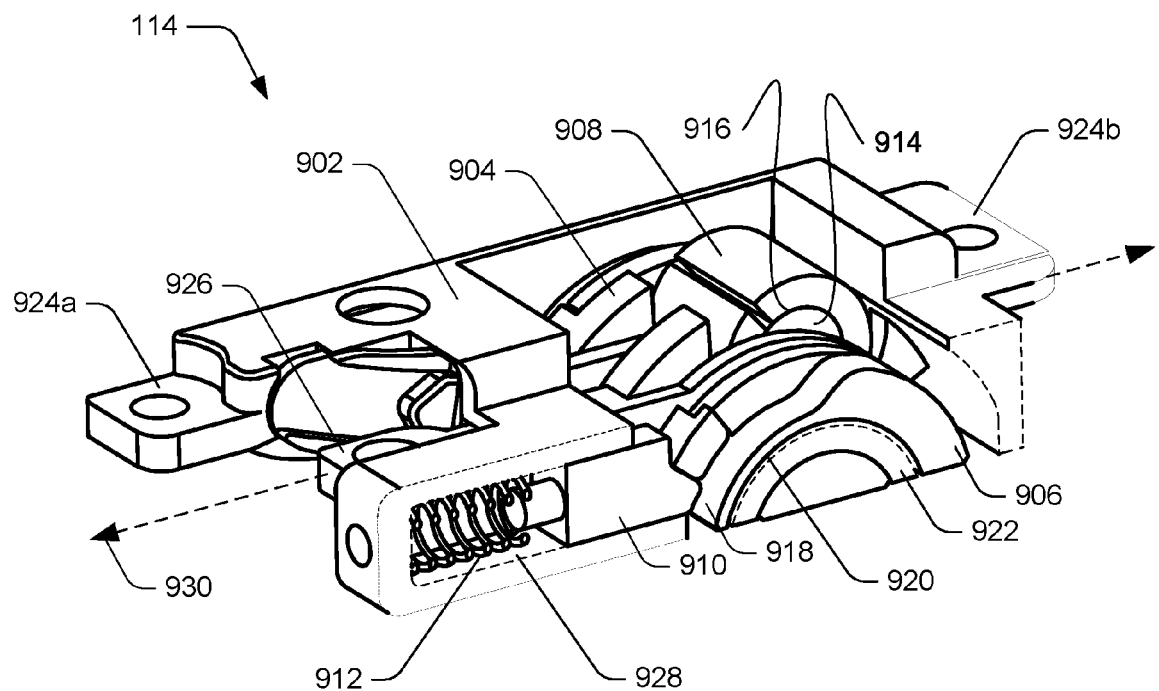
FIG. 9 depicts a side cutaway view of a friction hinge in accordance with one or more embodiments.

FIG. 9 depicts an isometric cutaway view of the friction hinge 114 in accordance with one or more implementations. In this particular view, a portion of a side of the friction hinge 114 is cut away to expose various components of the friction hinge 114. The friction hinge 114 and its various components can be formed using any suitable material and/or combination of materials, such as metals, plastics, polymers, alloys, and so forth. Generally, the view depicted in FIG. 9 represents the friction hinge 114 in a closed position, such as the position 202 depicted in FIG. 2.

Components of the friction hinge 114 include a hinge frame 902 in which various other components of the friction hinge 114 can be disposed. For example, the hinge frame 902 can be mounted to and/or within a device (e.g., the computing device 102) and function as a support structure for other components of the friction hinge 114.

Positioned within and/or attached to the hinge frame 902 are various components of the friction hinge 114, including a primary cam 904, a secondary cam 906, a friction lever 908, a cam follower 910, and a follower spring 912. Generally, these and other components of the friction hinge 114 interact during movement of the friction hinge 114 to provide a particular responsiveness profile over different hinge positions. Interaction between components of the friction hinge 114 are detailed in subsequent figures and discussion.

The primary cam 904 includes a friction pin 914 that is rotatably engaged within an aperture 916 of the friction lever 908. The friction pin 914, for instance, is crimped within the aperture 916. When the friction hinge 114 is actuated between various positions (e.g., opened and closed), the primary cam 904 pivots relative to the hinge frame 902. This pivoting of the primary cam 904 causes the friction pin 914 to rotate within and relative to the aperture 916. However, since the friction lever 908 is crimped around the friction pin 914, an interior surface of the aperture 916 provides frictional resistance to rotation of the friction pin 914. This frictional resistance contributes to a torque profile of the friction hinge 114 and enables the friction hinge 114 and an attached component (e.g., the support component 110) to be manipulated to and maintain a variety of different positions.

The secondary cam 906 includes a cam ramp 918 that represents a portion of an external surface of the secondary cam 906. As illustrated, the cam ramp 918 has a variable surface contour. According to one or more implementations, spring pressure from the follower spring 912 presses the cam follower 910 against the cam ramp 918. As further detailed below, frictional interaction between the cam follower 910 and the cam ramp 918 contributes to a torque profile of the friction hinge 114 over at least some operational positions of the friction hinge 114.

The secondary cam 906 further includes a guide slot 920 that engages with a guide rail 922 of the hinge frame 902. Since this particular view is a cutaway view, the guide rail 922 is show in dashed lines to indicate that a side of the hinge frame 902 has been cut away to reveal the guide rail 922. Generally, the guide rail 922 is engaged within the guide slot 920. During movement of the secondary cam 906 relative to the hinge frame 902, the guide rail 922 constrains and guides pivoting movement of the secondary cam 906.

The hinge frame 902 further includes a mounting portion 924a and a mounting portion 924b that include apertures through which fastening devices can be placed to attach the friction hinge 114 to an apparatus, such as the chassis 702 of the computing device 102.

The primary cam 904 includes a component mount 926, which represents a portion of the primary cam 904 that is attachable to a component. For instance, the component mount 926 is leveraged to attach the primary cam 904, and thus the friction hinge 114, to the support component 110. In this particular implementation, the component mount 926 includes an aperture through which a mounting mechanism such as a screw, a bolt, a rivet, and so forth, can be placed to attach the primary cam 904 to a component.

The cam follower 910 and the follower spring 912 are disposed within a follower channel 928 in the hinge frame 902. For instance, the cam follower 910 is slidable within the follower channel 928. During pivoting movement of the secondary cam 906, the cam ramp 918 pushes against the cam follower 910 to cause the cam follower 910 to slide within the follower channel 928 against spring pressure provided by the follower spring 912. Generally, sliding motion of the cam follower 910 within the cam channel 928 is co-directional with a longitudinal axis 930 of the friction hinge 114 and the hinge frame 902.

As discussed herein, "opening" of the support component 110 and/or the friction hinge 114 refers to a movement of the support component 110 and/or the friction hinge 114 away from a closed position (e.g., the position 202) toward an open position. Further, "closing" of the support component 110 and/or the friction hinge 114 refers to a movement of the support component 110 and/or the friction hinge 114 from an open position toward a closed position, e.g., toward the position 202.

Figure 10:
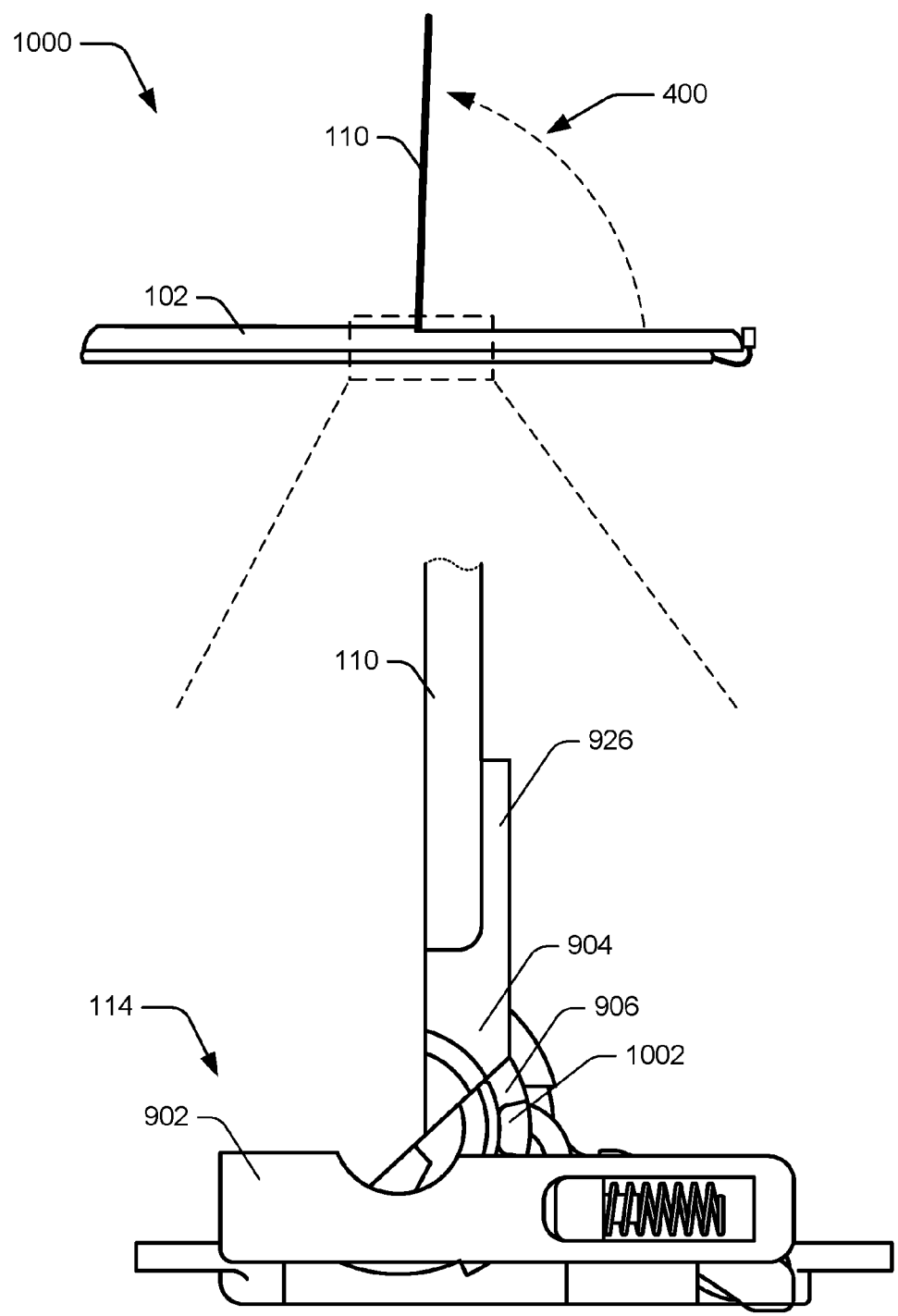
FIG. 10 depicts a side view of a friction hinge in accordance with one or more embodiments.

FIG. 10 depicts a side view 1000 of the friction hinge 114 in an open position, e.g., the position 402 discussed with reference to FIG. 4. A user, for instance, grasps and manipulates the support component 110 from a closed position to the position 402. The upper portion of FIG. 10 shows a side view of the computing device 102 with the support component 110 in the position 402. Shown in the lower portion of FIG. 10 is a portion of the support component 110 attached to the component mount 926.

In the position 402, the primary cam 904 is rotated partially out of the hinge frame 902. The secondary cam 906 is also rotated partially out of the hinge frame 902, but to a lesser degree than the primary cam 904. For instance, when the friction hinge 114 is initially opened from a closed position, the primary cam 904 rotates independently of the secondary cam 906. However, when the primary cam 904 reaches a "catch angle" relative to the rear surface 112 of the computing device 102 (e.g., 45°), a catch mechanism 1002 on the primary cam 904 engages with the secondary cam 906. Further opening of the primary cam 904 past the catch angle causes a corresponding rotation of the secondary cam 906.

Figure 11:
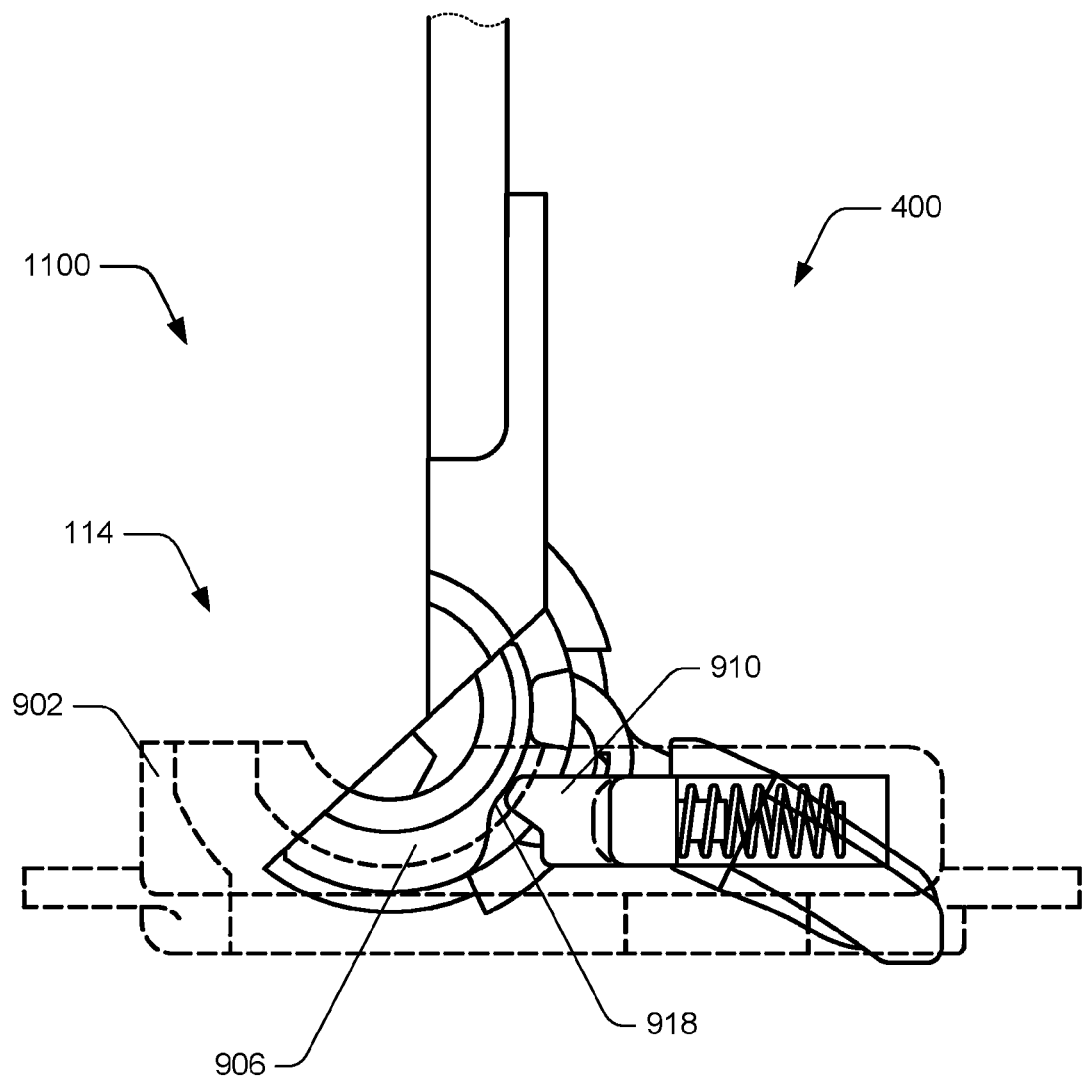
FIG. 11 depicts a side cutaway view of a friction hinge in accordance with one or more embodiments.

FIG. 11 depicts a side cutaway view 1100 of the friction hinge 114 in an open position, e.g., the position 402 discussed with reference to FIGS. 4 and 10. The view 1100 shows an outline of the hinge frame 902 in dashed lines. Also shown is the cam follower 910 in contact with the cam ramp 918 of the secondary cam 906. Generally, an amount of pressure applied by the cam follower 910 against the cam ramp 918 depends on a position of the secondary cam 906. For instance, and as detailed below, an amount of pressure applied by the cam follower 910 against the cam ramp 918 changes as the secondary cam 906 rotates and the cam follower 910 contacts different portions of the cam ramp 918.

Figure 12:
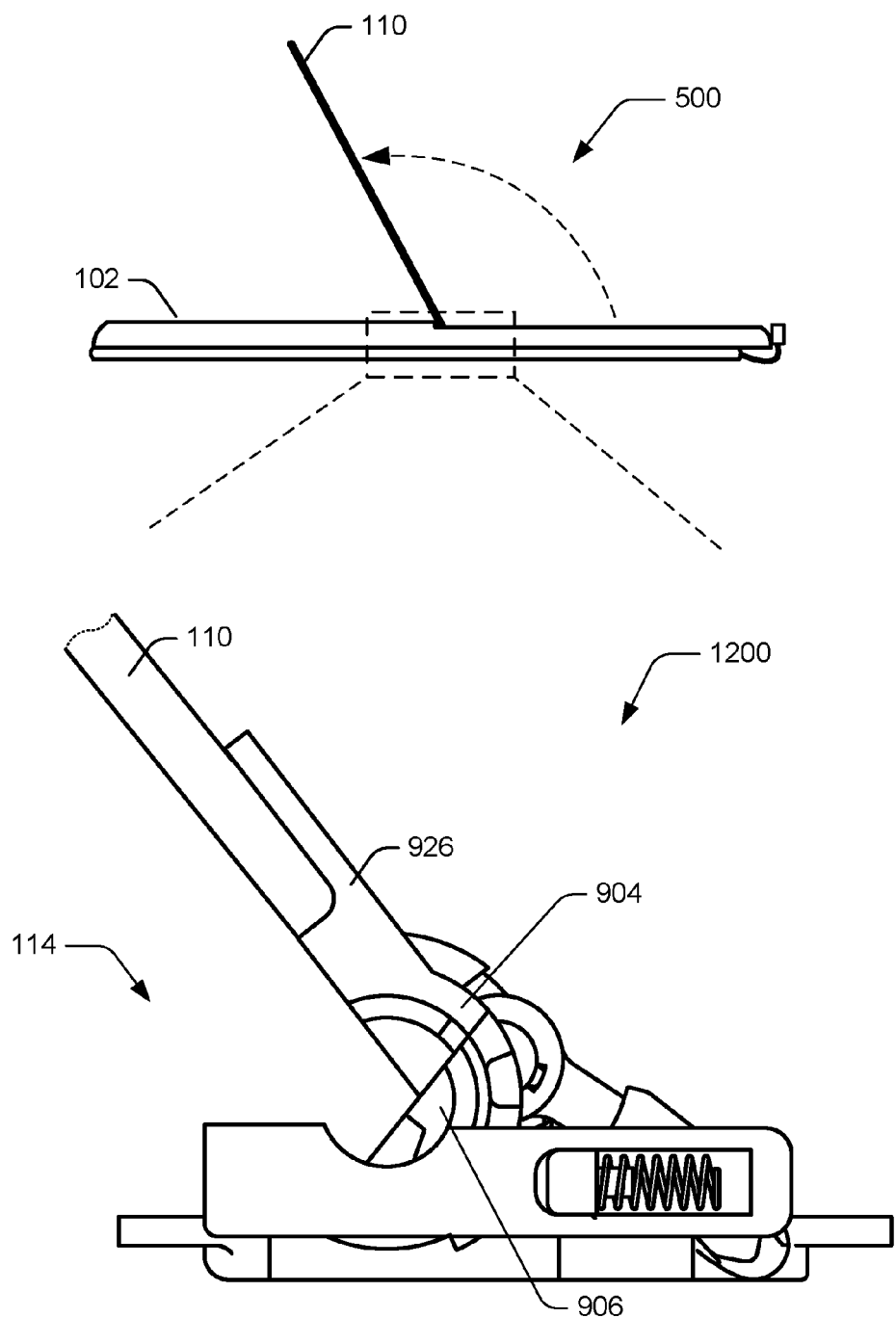
FIG. 12 depicts a side view of a friction hinge in accordance with one or more embodiments.

FIG. 12 depicts a side view 1200 of the friction hinge 114 in an open position, e.g., the position 502 discussed with reference to FIG. 5. A user, for instance, grasps and manipulates the support component 110 from the position 402 to the position 502. The upper portion of FIG. 12 shows a side view of the computing device 102 with the support component 110 in the position 502. Shown in the lower portion of FIG. 12 is a portion of the support component 110 attached to the component mount 926.

In the position 502, the primary cam 904 and the secondary cam 906 are rotated further out of the hinge frame 902 than as depicted with reference to the position 402. As discussed above, the primary cam 904 includes the catch feature 1002 that engages with the secondary cam 906 such that when the primary cam 904 is manipulated toward a further open position, the primary cam 904 pulls the secondary cam 906 thus causing corresponding movement of the secondary cam 906.

Figure 13:
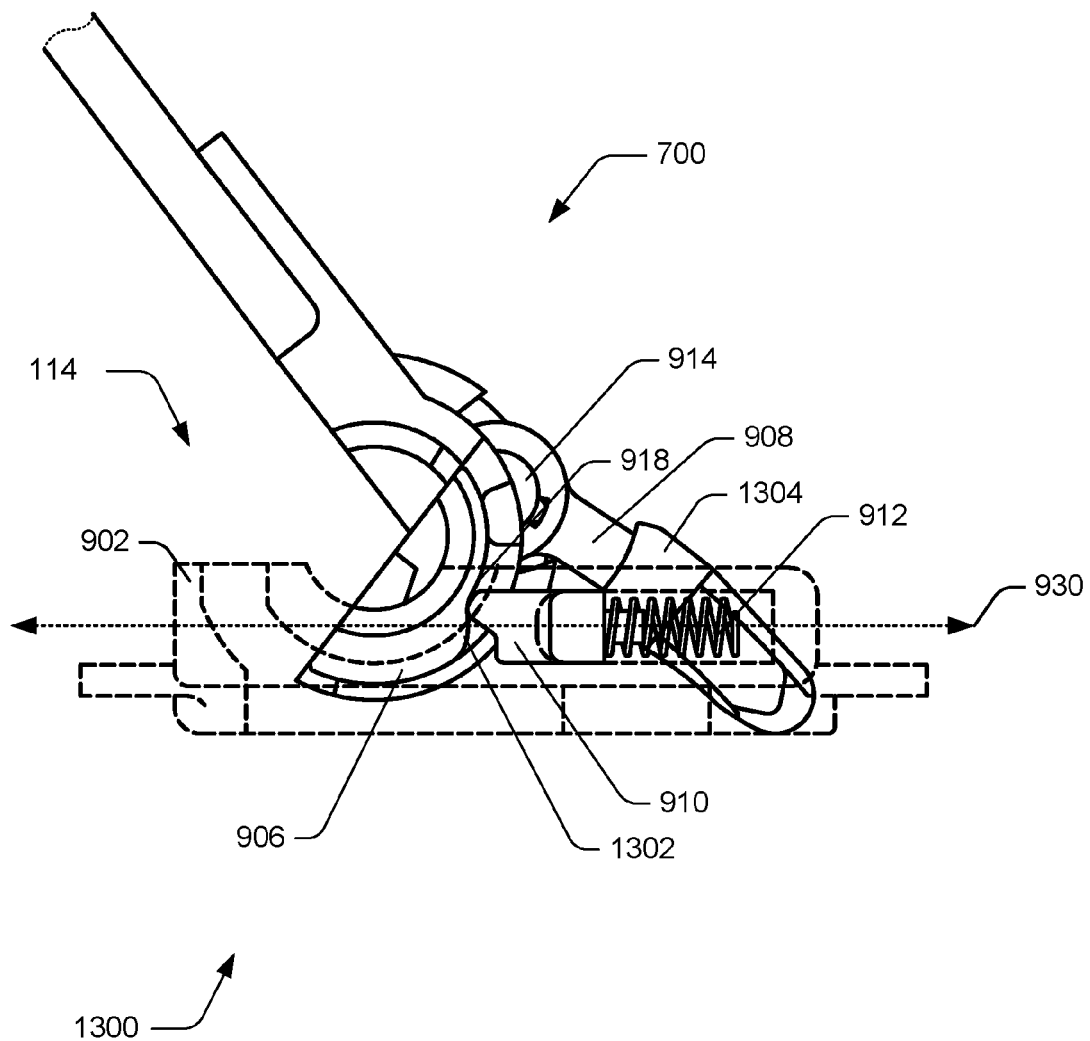
FIG. 13 depicts a side cutaway view of a friction hinge in accordance with one or more embodiments.

FIG. 13 depicts a side cutaway view 1300 of the friction hinge 114 in an open position, e.g., the position 502 discussed with reference to FIGS. 5 and 12. The view 1300 shows an outline of the hinge frame 902 in dashed lines.

The view 1300 shows that opening rotation of the secondary cam 906 causes the cam follower 910 to reach a ramp rise 1302 on a surface of the cam ramp 918. Generally, the ramp rise 1302 represents an inclined portion of the cam ramp 918 where the surface profile of the cam ramp 918 changes. For instance, the thickness of the cam ramp 918 begins to increase at the base of the ramp rise 1302 up to a maximum thickness at a top edge of the ramp rise 1302. As further detailed below, further opening rotation of the secondary cam 906 past the position 502 causes the ramp rise 1302 to push the cam follower 910 backward along the longitudinal axis 930 of the friction hinge 114 and against spring pressure from the follower spring 912. This compresses the follower spring 912 and increases frictional forces between the cam follower 910 and the cam ramp 910, thus increasing an amount of force required to further open the friction hinge 114.

FIG. 13 further depicts the friction lever 908 fastened around the friction pin 914. As mentioned above, during pivoting of the primary cam 904, the friction pin 914 rotates within the friction lever 908 to provide frictional resistance to movement of the primary cam 904. Further, during pivoting of the primary cam 904, the friction lever 908 slides within a lever sheath 1304 that is pivotably attached to the hinge frame 902.

Figure 14:
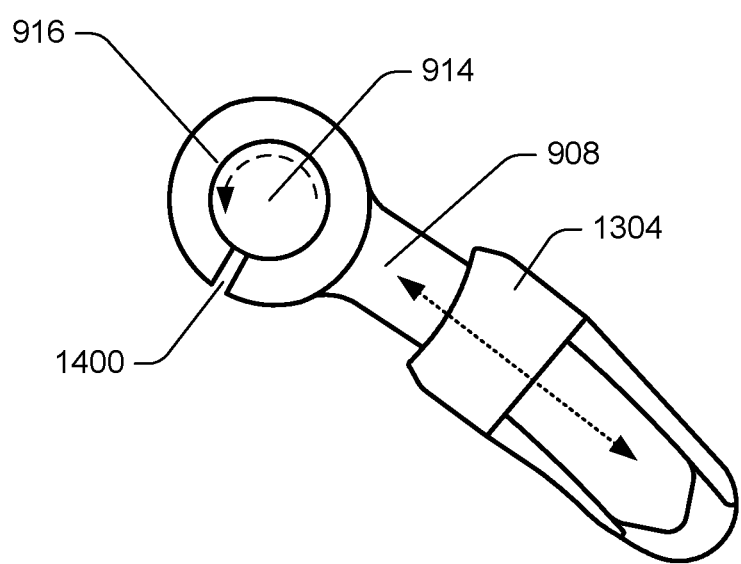
FIG. 14 depicts a friction lever in accordance with one or more embodiments.

FIG. 14 depicts the friction lever 908 separately from other components of the friction hinge 114. Shown here is that the aperture 916 of the friction lever 908 includes a slot 1400. According to various implementations, this enables the friction lever 908 to be crimped (e.g., pinched) around the friction pin 914 such that rotation of the friction pin 914 within the friction lever 908 is subject to frictional force introduced by the interface between the inside surface of the aperture 916 and the outer surface of the friction pin 914.

Further shown is the lever sheath 1304. Generally, during movement of the friction hinge 114, the friction lever 908 slides within the lever sheath 1304. This enables the friction lever 908 to move translationally when the primary cam 904 is rotated, and keeps the friction lever 908 attached to the friction hinge 114.

Figure 15:
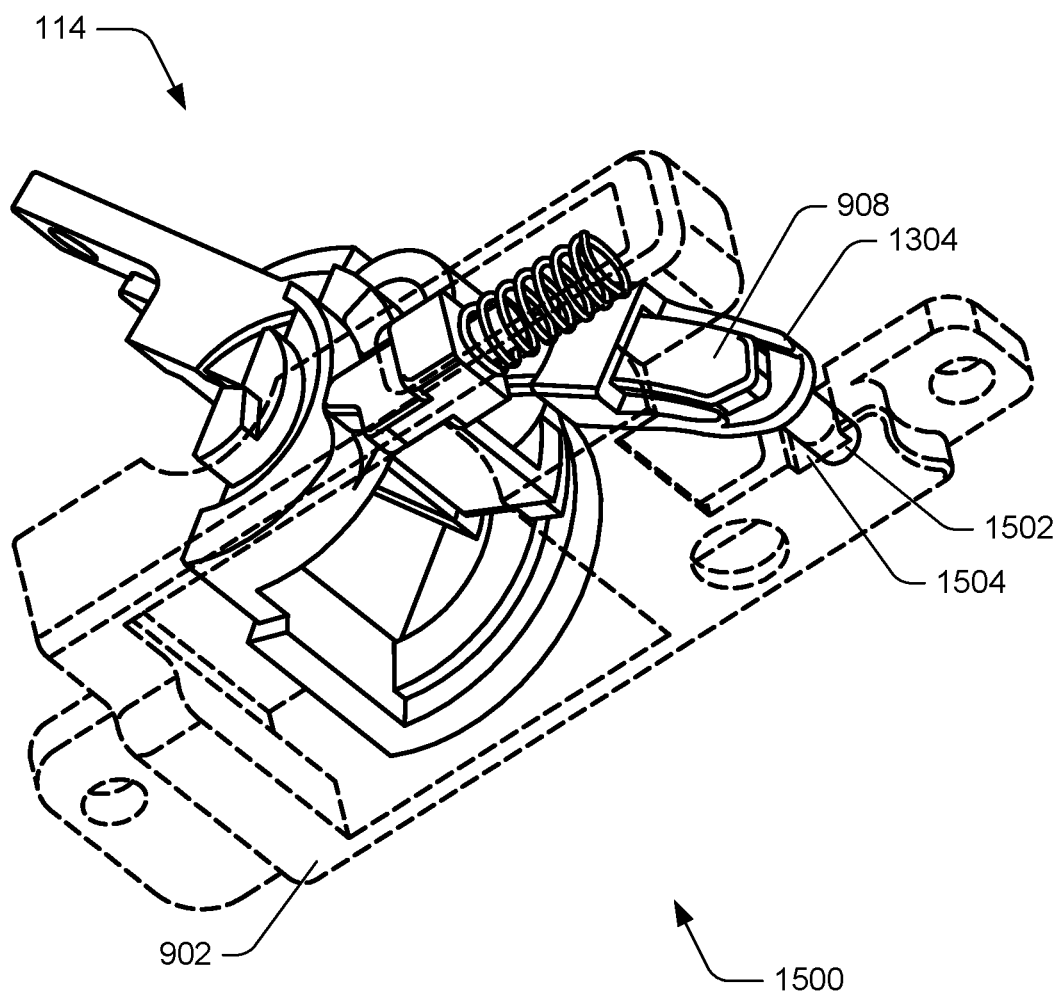
FIG. 15 depicts an underside view of a friction hinge in accordance with one or more embodiments.

FIG. 15 depicts an underside view 1500 of the friction hinge 114 in an open position, e.g., the position 502 introduced above. Shown here is a sheath pin 1502 of the lever sheath 1304 rotatably engaged within a pin slot 1504 within the hinge frame 902. Engagement of the sheath pin 1502 within the pin slot 1504 enables the lever sheath 1304 to rotate relative to the hinge frame 902. For instance, when the friction hinge 114 is pivoted between different positions, the friction lever 908 will pivot slightly relative to the hinge frame 902. Pivoting movement of the sheath pin 1502 within the pin slot 1504 enables the friction lever 908 to pivot while maintaining engagement of the friction lever 908 within the lever sheath 1304.

Figure 16:
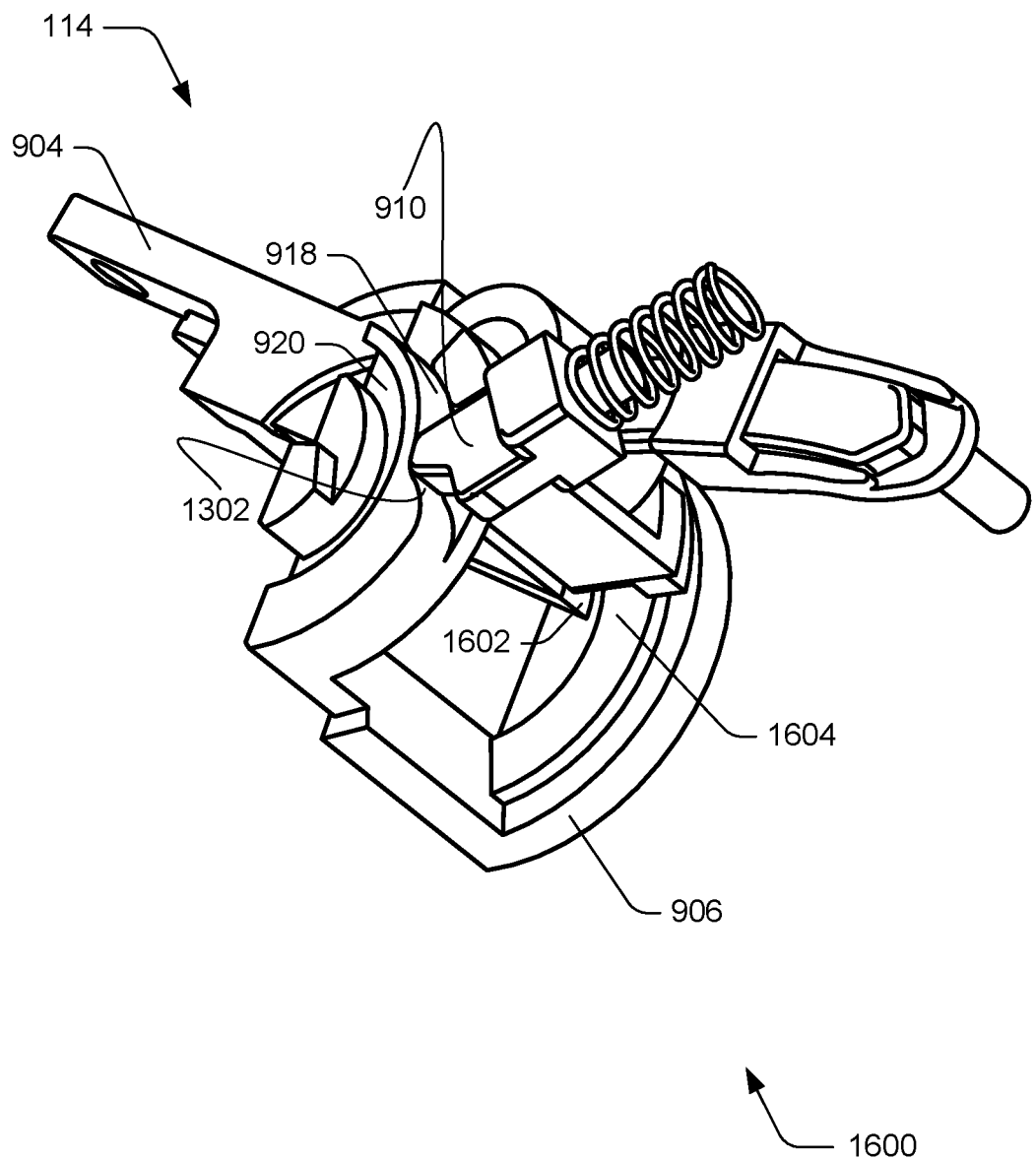
FIG. 16 depicts an underside view of a friction hinge in accordance with one or more embodiments.

FIG. 16 depicts an underside view 1600 of the friction hinge 114 in an open position, e.g., the position 502 introduced above. Shown here are components of the friction hinge 114 separated from the hinge frame 902. For instance, the cam follower 910 is shown positioned in contact with the cam ramp 918 at the base of the ramp rise 1302.

The view 1600 further shows a guide slot 1602 in the primary cam 904 engaged with a guide rail 1604 on an inner surface of the secondary cam 906. Generally, engagement of the guide rail 1604 within the guide slot 1602 guides rotational movement of the primary cam 904 when the friction hinge 114 is pivoted between various positions. While not expressly illustrated here, the primary cam 904 similarly includes another guide slot on an opposite side of the primary cam 904, which engages with another guide rail on an opposite inside edge of the secondary cam 906.

The view 1600 also shows the guide slot 920 in the secondary cam 906. As explained above in the discussion of FIG. 9, the guide rail 922 of the hinge frame 902 (shown in FIG. 9) engages within the guide slot 920 to enforce rotational movement of the secondary cam 906 when the friction hinge 114 is pivoted between various positions.

Figure 17:
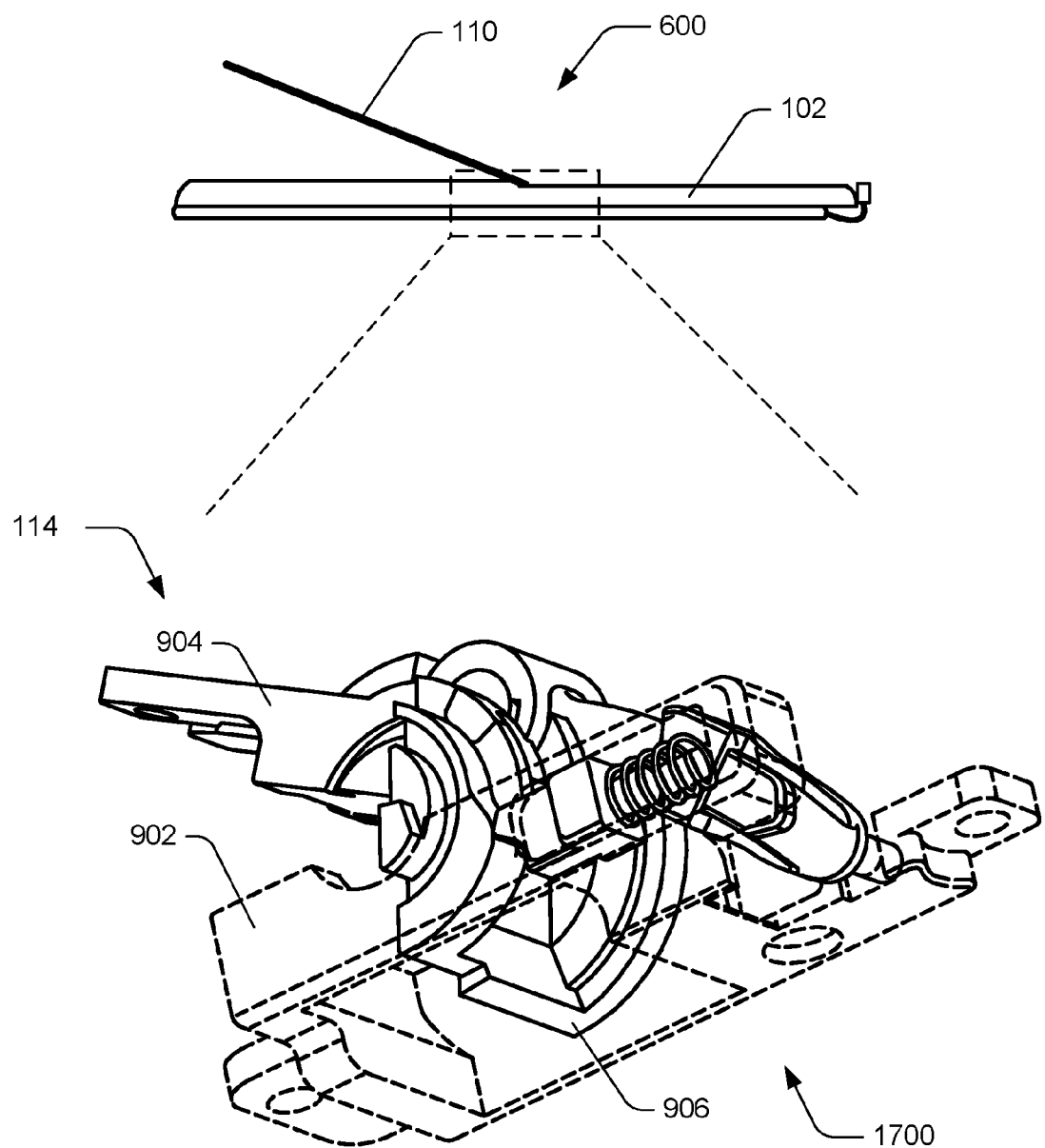
FIG. 17 depicts an underside view of a friction hinge in accordance with one or more embodiments.

FIG. 17 depicts an underside view 1700 of the friction hinge 114 in an open position, e.g., the position 602 discussed with reference to FIG. 6. A user, for instance, grasps and manipulates the support component 110 from the position 502 to the position 602. The upper portion of FIG. 17 shows a side view of the computing device 102 with the support component 110 in the position 602.

The view 1700 generally depicts the orientation of the primary cam 904 and the secondary cam 906 relative to the hinge frame 902 in the position 600

Figure 18:
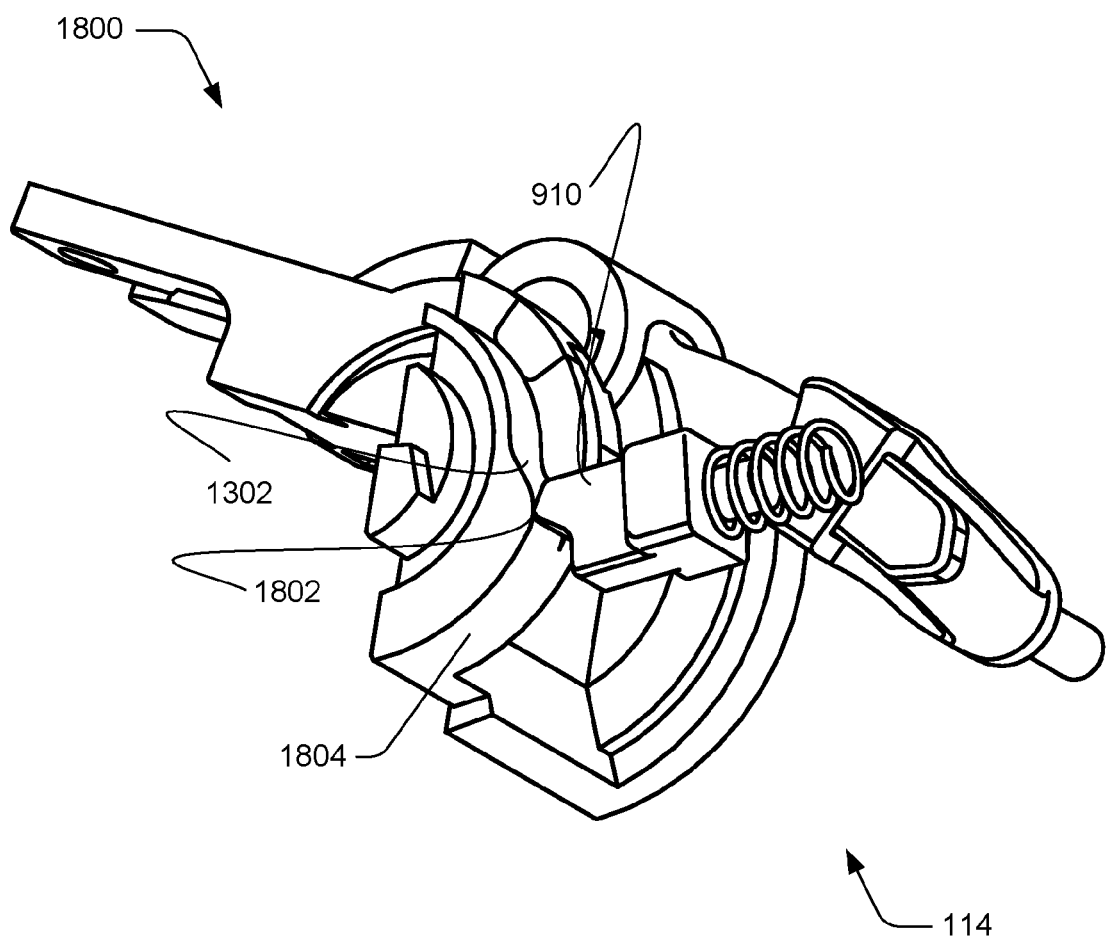
FIG. 18 depicts a side view of a friction hinge in accordance with one or more embodiments.

FIG. 18 depicts a side view 1800 of the friction hinge 114 in the position 602. Notice that in transitioning from the position 502 to the position 602, the cam follower 910 moves from the bottom of the ramp rise 1302 to a stop position 1802 near the top of the ramp rise 1302. Generally, the stop position 1802 represents a maximum operating open position for the friction hinge 114. The top of the ramp rise 1302 and beyond, for instance, is a release region 1804 that represents an "emergency escape" position for the friction hinge 114. For example, consider that a user opens the friction hinge 114 to the position 602, such as for viewing content on the computing device 102. Consider then that the user accidentally drops a book on the computing device 102, causing the support component 110 and thus the friction hinge 114 to open to a further position past the stop position 602 such that the cam follower 910 moves to the release region 1804. At this point the friction hinge 114 can be moved back to an operating position (e.g., the position 600) by applying closing force to the support component 110 to close the friction hinge 114 back to a normal operating position.

Figure 19:
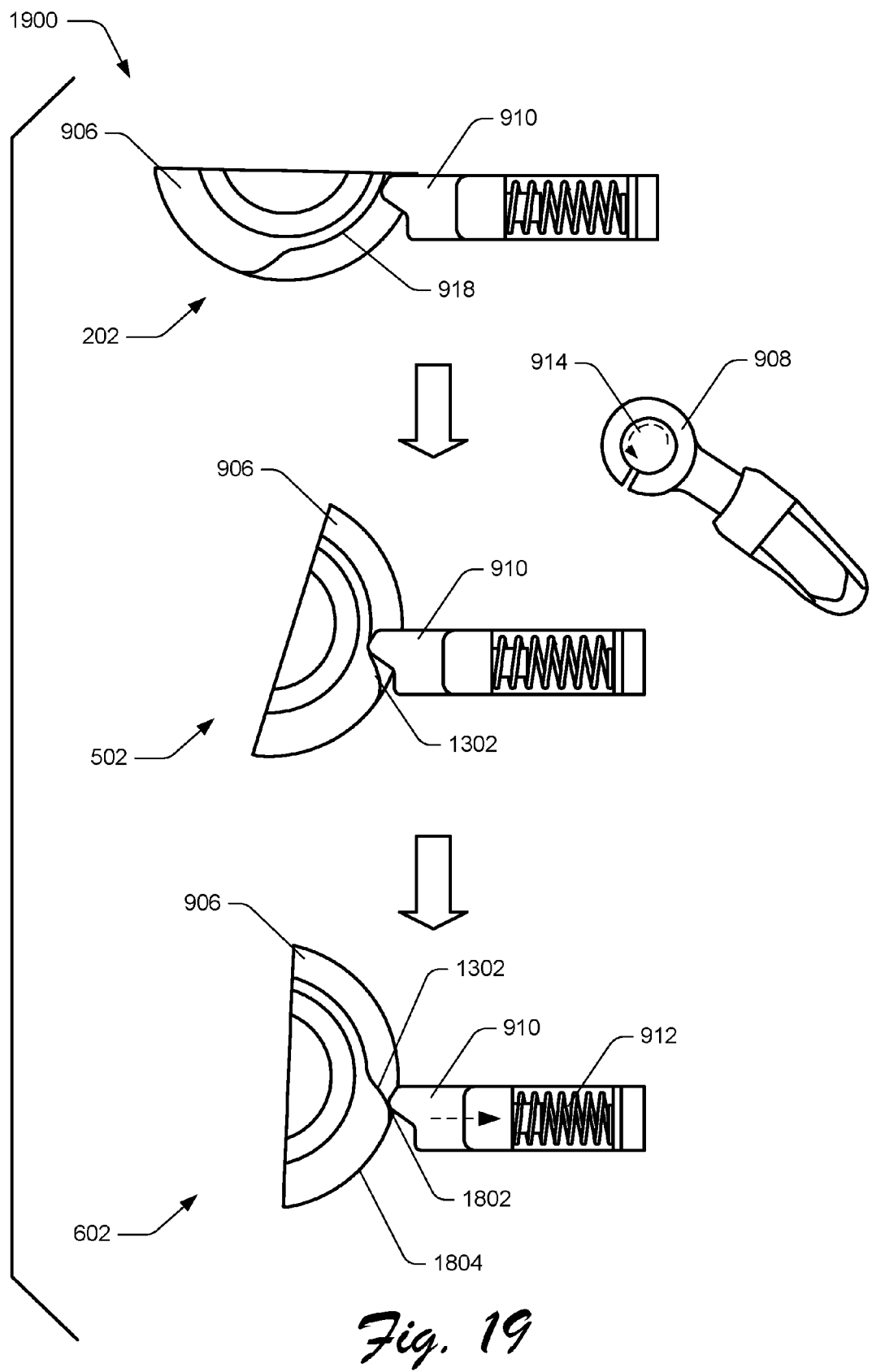
FIG. 19 depicts an example implementation scenario for illustrating different torque forces that apply to a friction hinge in accordance with one or more embodiments.

FIG. 19 depicts an example implementation scenario 1900 for illustrating different torque forces that apply to the friction hinge 114 in accordance with one or more implementations. For ease of understanding, the scenario 1900 depicts the secondary cam 906 and the cam follower 910 separately from other components of the friction hinge 114.

The upper portion of the scenario 1900 shows the cam follower 910 positioned relative to the secondary cam 906 according to a closed position of the friction hinge 114, e.g., the position 202 discussed with reference to FIG. 2. In this particular position, the cam follower 910 contacts the cam ramp 918. Alternatively, the cam follower 910 may rest slightly above the surface of the cam ramp 918 and thus not contact the cam ramp 918.

Proceeding from the upper portion to the center portion of the scenario 1900 shows the secondary cam 906 pivoting from the closed position to the open position 502 introduced with reference to FIG. 5. For instance, a user manipulates the support component 110 from a closed position to the open position 502. As illustrated, in the position 502 the cam follower 910 is positioned on the cam ramp 918 at the base of the ramp rise 1302. Generally, this transition from the closed position to the open position 502 represents a first friction range for the friction hinge 114 where frictional forces that resist pivoting of the friction hinge 114 primarily result from frictional interaction between the friction lever 908 and the friction pin 914. This first friction range, for instance, represents a first torque range that describes external torque forces required to move the friction hinge 114, and thus an attached component such as the support component 110, from a closed position to the position 502.

Proceeding from the center portion to the lower portion of the scenario 1900 shows the secondary cam 906 pivoting from the position 502 to the position 602 introduced with reference to FIG. 6. For instance, a user manipulates the support component 110 from the open position 502 to the position 602. As illustrated, moving from the position 502 to the position 602 involves the cam follower 910 moving from the base of the ramp rise 1302 and up the ramp rise 1302 to the stop position 1802. Notice, for instance, that interaction between the ramp rise 1302 and the cam follower 910 presses the cam follower 910 against the follower spring 912 and compresses the follower spring 912. Resistance from the follower spring 912 to compression by the cam follower 910 contributes frictional resistance to pivoting of the secondary cam 906, and thus increases torque force required to move the friction hinge 114 from the position 502 to the position 602.

Generally, this transition from the position 502 to the position 602 represents a second friction range for the friction hinge 114 where frictional forces that resist pivoting of the friction hinge 114 result from not only frictional interaction between the friction lever 908 and the friction pin 914, but also additional frictional interaction between the cam follower 910 and the ramp rise 1302. This second friction range, for instance, represents a second torque range that describes external torque forces required to move the friction hinge 114, and thus an attached component such as the support component 110, from a closed position to the position 502. According to various implementations, the second torque range represents higher torque forces than the first torque range described above such that moving the friction hinge 114 from the position 502 to the position 602 requires more externally-applied force than does moving the friction hinge from a closed position to the position 502.

As described above, further opening of the friction hinge 114 past the position 602 represents an emergency release feature of the friction hinge 114 and is beyond a pre-specified usage range for the friction hinge 114. For instance, pivoting the secondary cam 906 such that the cam follower 910 transitions beyond the stop position 1802 to the release region 1804 requires significantly more force than does pivoting the secondary cam 906 from the position 502 to the position 602. According to one or more implementations, when sufficient force is applied to the friction hinge 114 to cause the cam follower 910 to transition to the release region 1804, the friction hinge 114 may fully open such that the support component 110 collapses against the rear surface 112 of the computing device 102 at a position 180° from fully closed.

Figure 20:
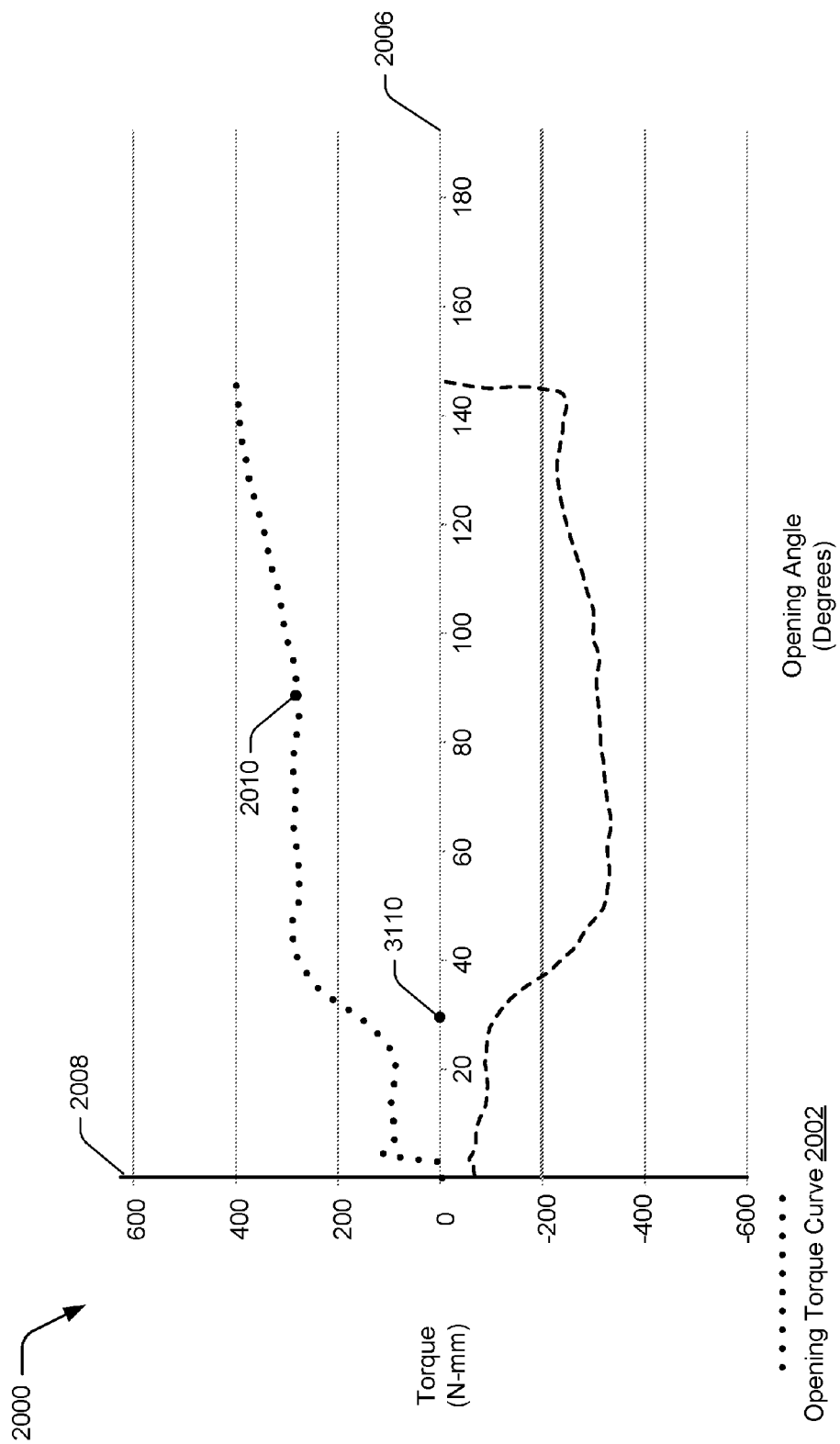
FIG. 20 illustrates a torque graph for a friction hinge in accordance with one or more embodiments.

FIG. 20 illustrates a torque graph 2000 that includes an opening torque curve 2002 and a closing torque curve 2004. The torque graph 2000 further includes an angle axis 2006 and a torque axis 2008. The angle axis 2006 (i.e., the x-axis) indicates opening angle values for the support component 110 relative to an associated apparatus, e.g., the computing device 102. The torque axis 2008 (i.e., the y-axis) indicates different torque values for the torque graph 2000. In this particular example, the torque values are indicated in New-ton-millimeters (N-mm). This is not to be interpreted as limiting, however, and torque values may be measured in a variety of different units. Further, different forces may be measured to characterize the movement of the friction hinge 114 and/or the support component 110.

According to one or more implementations, the opening torque curve 2002 represents torque transferred from the support component 110 to the primary cam 904 when the support component 110 is opened (e.g., via user manipulation) from a closed position to various open positions. The closing torque curve 2004 represents torque transferred from the support component 110 to the primary cam 904 when the support component 110 is moved (e.g., via user manipulation) from various open positions towards a closed position.

Generally, the different torque curves are associated with certain "action points" or "action regions" that demonstrate the overall responsiveness profile of the friction hinge 114. For instance, a region of the opening torque curve 2002 from 0° to a torque transition point 2010 shows torque force required to move the friction hinge 114 from a closed position (0°) to a particular open position, e.g., the position 502 depicted in FIG. 5. Resistance of movement of the friction hinge from 0° to the torque transition point 2010 primarily results from frictional interaction between the friction pin 914 and the friction lever 908. In at least some implementations, the portion of the opening torque curve 2002 from 0° to the torque transition point 2010 and the corresponding angle values from the angle axis 2006 represent a first opening angle range for the friction hinge 114.

The opening torque curve 2002 further shows that torque force begins to increase when the friction hinge 114 is opened past the torque transition point 2010. For instance, portions of the opening torque curve 2002 past the torque transition point 2010 represent torque force required to open the friction hinge 114 past the position 502. As detailed above, opening the friction hinge 114 past the position 502 involves movement of the cam follower 910 up the ramp rise 1302, which increases resistance of the friction hinge 114 to opening. Generally, opening of the friction hinge 114 past the position 502 and the torque transition point 2010 involves frictional forces that result from both the frictional interaction between the friction pin 914 and the friction lever 908, and the added frictional interaction between the cam follower 910 and the ramp rise 1302 of the cam ramp 918.

For instance, consider that as the support component 110 is opened further past the position 502, gravitational force transferred to the friction hinge 114 increases due to increasing weight of the computing device 102 being borne by the support component 110, and thus the friction hinge 114. According to various implementations, the increase in torque as the friction hinge 114 opens past the torque transition point 2010 accounts for (e.g., resists) this increase in downward gravitational force on the friction hinge 114, thus enabling the friction hinge 114 to assume various open positions past the position 502 without collapsing.

Further to the torque graph 2000, torque required to close the support component 110 from the various open positions is characterized by the closing torque curve 2004. Generally, the interpretation of the closing torque curve 2004 is opposite that of the opening torque curve 2002 since the direction of motion (e.g., closing vs. opening) is reversed. In at least some embodiments, for example, negative torque values on the closing torque curve 2004 represent actual closing torque applied by a user to the support component 110.

In operation, the "friction" character of the friction hinge 114 is such that if a user manipulates the support component 110 to any position along the opening torque curve 2002 and/or the closing torque curve 2004 and releases the support component 110, the friction hinge 114 and thus the support component 110 will remain in the released position absent external force to move the support component 110 from that position.

Figure 21:
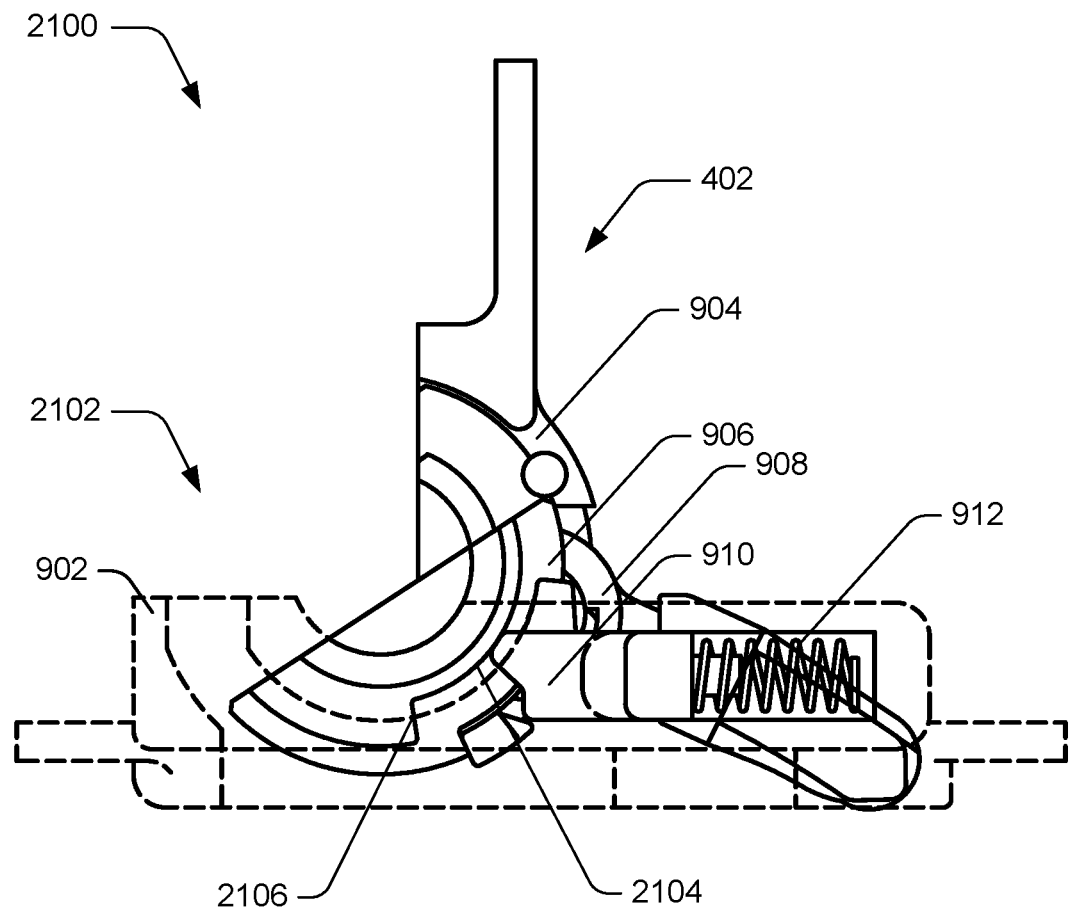
FIG. 21 depicts a side cutaway view of a friction hinge in accordance with one or more embodiments.

FIG. 21 depicts a side cutaway view 2100 of a friction hinge 2102 in the position 402, which represents a variation on the friction hinge 114 described above. For instance, some of the various components and interactions of the friction hinge 114 detailed above also apply to the friction hinge 2101, such as the hinge frame 902, the primary cam 904, the secondary cam 906, the friction lever 908, the cam follower 910, and the follower spring 912. The friction hinge 2102, however, includes a cam ramp 2104 of a different configuration than the cam ramp 918 of the friction hinge 114. For instance, instead of having the ramp rise 1302 with a gradually sloping profile, the cam ramp 2104 has a ramp stop 2106 that is much steeper than the ramp rise 1302. For instance, a surface of the ramp stop 2106 relative to the camp ramp 2104 is steeper than the surface of the ramp rise 1302 relative to the surface of the cam ramp 918. In at least some implementations, the surface of the ramp stop 2106 is perpendicular to the surface of the cam ramp 2104.

Figure 22:
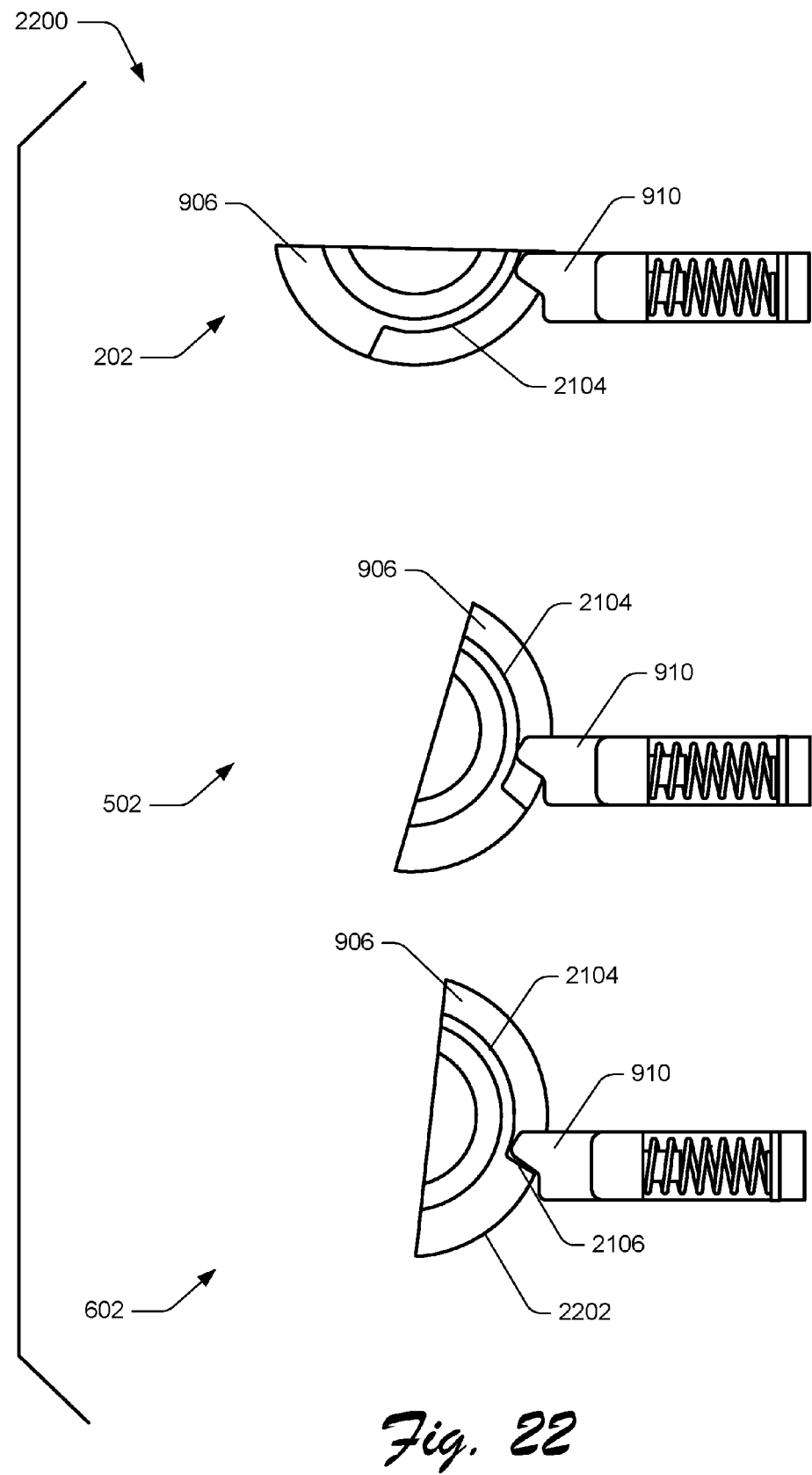
FIG. 22 depicts an example implementation scenario for illustrating different torque forces that apply to a friction hinge in accordance with one or more embodiments.

FIG. 22 depicts an example implementation scenario 2200 for illustrating different torque forces that apply to the friction hinge 2102 in accordance with one or more implementations. For ease of understanding, the scenario 2200 depicts the secondary cam 906 and the cam follower 910 separately from other components of the friction hinge 2102.

The upper portion of the scenario 2200 shows the cam follower 910 positioned relative to the secondary cam 906 according to a closed position of the friction hinge 114, e.g., the position 202 discussed with reference to FIG. 2. In this particular position, the cam follower 910 contacts the cam ramp 2104. Alternatively, the cam follower 910 may rest slightly above the surface of the cam ramp 2104 and thus not contact the cam ramp 2104.

Proceeding from the upper portion to the center portion of the scenario 2200 shows the secondary cam 906 pivoting from the closed position to the open position 502 introduced with reference to FIG. 5. For instance, a user manipulates the support component 110 from a closed position to the open position 502. As illustrated, in the position 502 the cam follower 910 is positioned on the cam ramp 2104. Generally, frictional forces that resist pivoting of the friction hinge 2102 from the closed position to the position 502 primarily result from frictional interaction between the friction lever 908 and the friction pin 914, as detailed above.

Proceeding from the center portion to the lower portion of the scenario 2200 shows the secondary cam 906 pivoting from the position 502 to the position 602 introduced with reference to FIG. 6. For instance, a user manipulates the support component 110 from the open position 502 to the position 602. As illustrated, moving from the position 502 to the position 602 involves the cam follower 910 moving along the cam ramp 2104 to the ramp stop 2106.

In at least some implementations, the position 602 represents a stop position for the friction hinge 2102. For instance, further opening of the friction hinge past the position 602 represents an emergency release feature of the friction hinge 2102 and is beyond a pre-specified usage range for the friction hinge 2102. For instance, pivoting the secondary cam 906 such that the cam follower 910 transitions beyond the ramp stop 2106 to a release region 2202 requires significantly more torque than does pivoting the secondary cam 906 from the position 502 to the position 602. Further, with reference to the friction hinge 114, opening the friction hinge 2102 beyond the ramp stop 2106 requires significantly more torque than does opening the friction hinge 114 beyond the stop position 1802 to the release region 1804.

According to one or more implementations, when sufficient force is applied to the friction hinge 2102 to cause the cam follower 910 to transition to the release region 2202, the friction hinge 2102 may fully open such that the support component 110 collapses against the rear surface 112 of the computing device 102 at a position 180° from fully closed.

Figure 23:
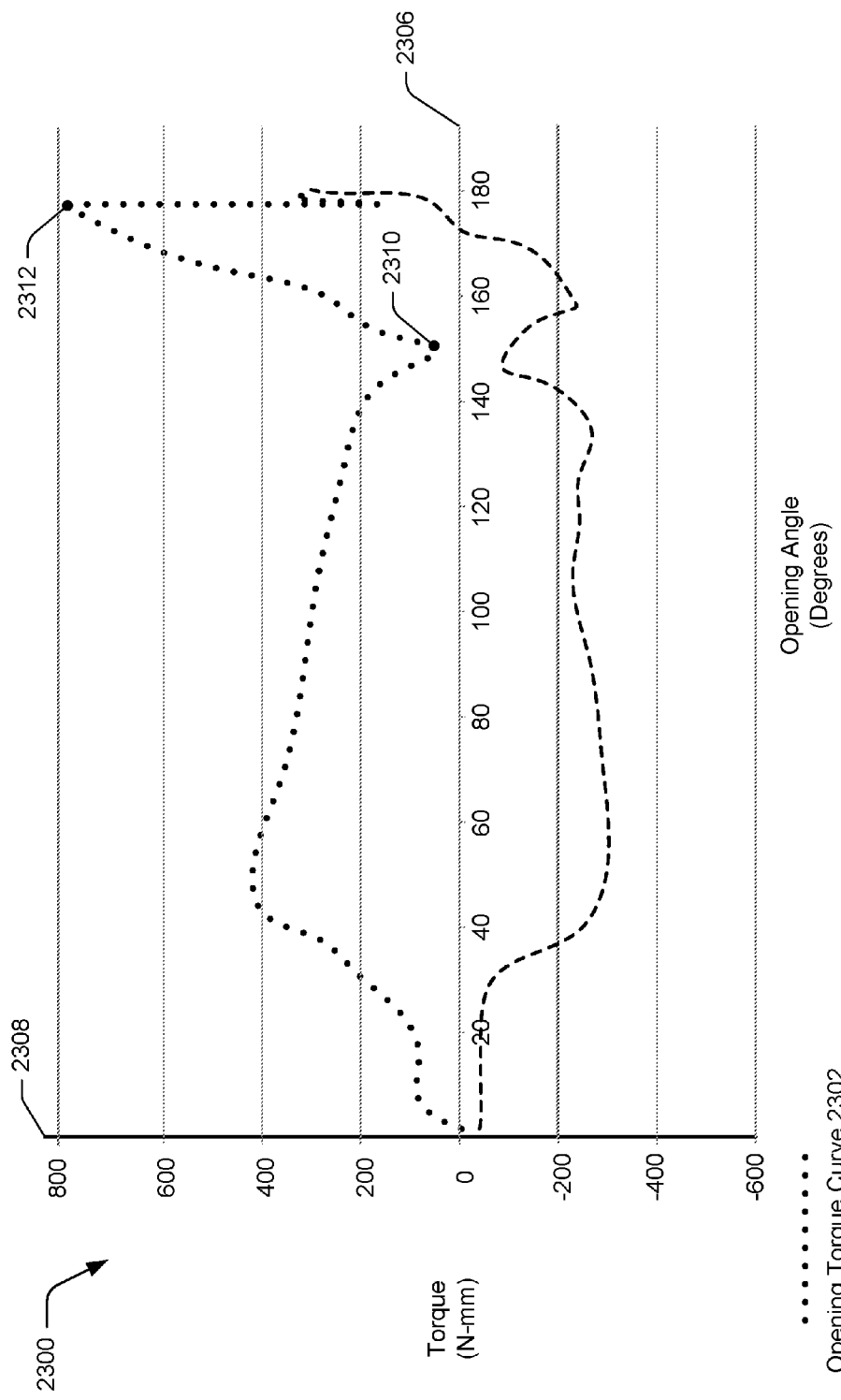
FIG. 23 illustrates a torque graph for a friction hinge in accordance with one or more embodiments.

FIG. 23 illustrates a torque graph 2300 that includes an opening torque curve 2302 and a closing torque curve 2304. Generally, the opening torque curve 2302 and the closing torque curve 2304 represent torque values based on the friction hinge 2102. The torque graph 2300 further includes an angle axis 2306 and a torque axis 2308. The angle axis 2306 (i.e., the x-axis) indicates opening angle values for the support component 110 relative to an associated apparatus, e.g., the computing device 102. The torque axis 2308 (i.e., the y-axis) indicates different torque values for the torque graph 2300. In this particular example, the torque values are indicated in Newton-millimeters (N-mm). This is not to be interpreted as limiting, however, and torque values may be measured in a variety of different units. Further, different forces may be measured to characterize the movement of the friction hinge 2102 and/or the support component 110.

According to one or more implementations, the opening torque curve 2302 represents torque transferred from the support component 110 to the primary cam 904 of the friction hinge 2102 when the support component 110 is opened (e.g., via user manipulation) from a closed position to various open positions. The closing torque curve 2304 represents torque transferred from the support component 110 to the primary cam 904 of the friction hinge 2102 when the support component 110 is moved (e.g., via user manipulation) from various open positions towards a closed position.

As illustrated, the torque forces depicted in the torque graph 2300 for the friction hinge 2102 differ from the torque forces that apply to the friction hinge 114 as shown in the torque graph 2000. For instance, the opening torque curve 2302 includes a torque transition point 2310, which represents an opening of the friction hinge 2102 to a maximum operating position, e.g., the position 602 depicted in FIG. 22. As indicated, torque required to open the friction hinge 2102 further past the torque transition point 2310 rapidly increases. For instance, torque rapidly increases until the opening torque curve 2302 reaches an escape position 2312 at approximately 171°. After the escape position 2312, the torque values rapidly drop, indicating that the friction hinge 2102 has disengaged. Generally, opening of the friction hinge 2102 further past the torque transition point 2310 to the escape position 2312 represents an emergency escape position that enables the friction hinge 2102 to be opened further past the position 602 without breaking the hinge should an inadvertent action occur, such as a user accidentally leaning against the computing device 102 when the support component 110 is in the position 602.

Further to the torque graph 2300, torque required to close the support component 110 from the various open positions is characterized by the closing torque curve 2304. Generally, the interpretation of the closing torque curve 2304 is opposite that of the opening torque curve 2302 since the direction of motion (e.g., closing vs. opening) is reversed. In at least some embodiments, for example, negative torque values on the closing torque curve 2304 represent actual closing torque applied by a user to the support component 110.

Accordingly, implementations discussed herein provide a friction hinge that enables an attached component (e.g., a kickstand) to be adjusted between multiple positions. Further, the friction hinge includes multiple friction stages such that as the friction hinge opens, frictional resistance to further opening of the friction hinge increases. This enables the friction hinge and an attached support component to account for increases in gravitational forces that occur due to an increasingly shallow angle between the support component and an adjacent surface. It is to be appreciated that the example device orientations, support component positions, hinge positions, component scale, torque values, and so forth discussed above are presented for purposes of example only. Thus, a wide variety of different device orientations, support component positions, hinge positions, and torque values not specifically mentioned herein may be implemented within the spirit and scope of the claimed embodiments.

Example System and Device

Figure 24:
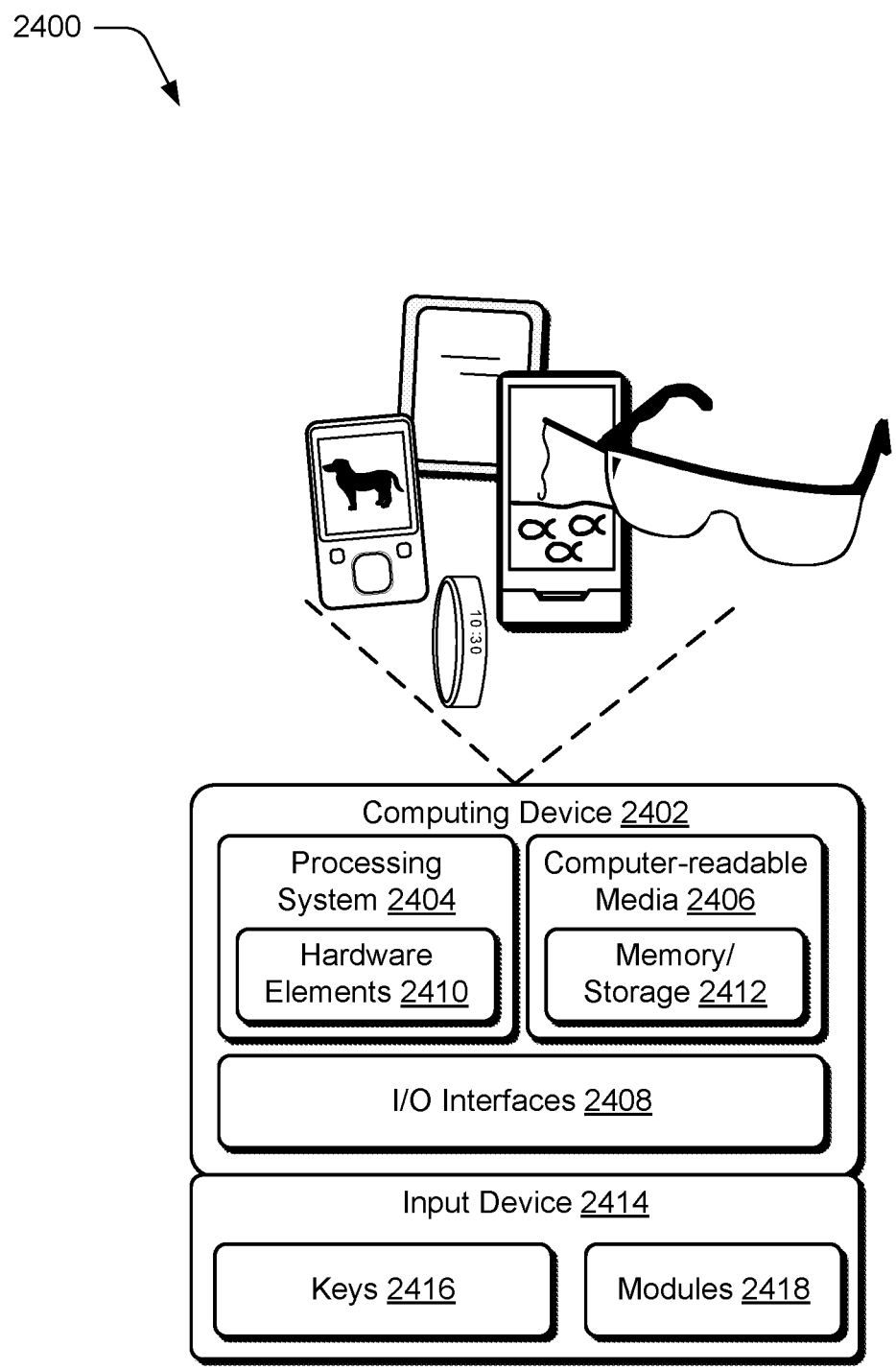
FIG. 24 illustrates an example system including various components of an example device that can be implemented as any type of computing device as described with reference to FIGS. 1-23 to implement embodiments of the techniques described herein.

FIG. 24 illustrates an example system generally at 2400 that includes an example computing device 2402 that is representative of one or more computing systems and/or devices that may implement the various techniques described herein. In at least some implementations, the computing device 2402 represents an implementation of the computing device 102 discussed above. The computing device 2402 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 2402 as illustrated includes a processing system 2404, one or more computer-readable media 2406, and one or more I/O interface 2408 that are communicatively coupled, one to another. Although not shown, the computing device 2402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2404 is representative of functionality to perform one or more operations using hardware. Accordingly, the processing system 2404 is illustrated as including hardware element 2410 that may be configured as processors, functional blocks, and so forth. This may include implementation in hardware as an application specific integrated circuit or other logic device formed using one or more semiconductors. The hardware elements 2410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2406 is illustrated as including memory/storage 2412. The memory/storage 2412 represents memory/storage capacity associated with one or more computer-readable media. The memory/storage component 2412 may include volatile media (such as random access memory (RAM) and/or nonvolatile media (such as read only memory (ROM), Flash memory, optical disks, magnetic disks, and so forth). The memory/storage component 2412 may include fixed media (e.g., RAM, ROM, a fixed hard drive, and so on) as well as removable media (e.g., Flash memory, a removable hard drive, an optical disc, and so forth). The computer-readable media 2406 may be configured in a variety of other ways as further described below.

Input/output interface(s) 2408 are representative of functionality to allow a user to enter commands and information to computing device 2402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2402 may be configured in a variety of ways to support user interaction.

The computing device 2402 is further illustrated as being communicatively and physically coupled to an input device 2414 that is physically and communicatively removable from the computing device 2402. In this way, a variety of different input devices may be coupled to the computing device 2402 having a wide variety of configurations to support a wide variety of functionality. In this example, the input device 2414 includes one or more keys 2416, which may be configured as pressure sensitive keys, mechanically switched keys, and so forth.

The input device 2414 is further illustrated as include one or more modules 2418 that may be configured to support a variety of functionality. The one or more modules 2418, for instance, may be configured to process analog and/or digital signals received from the keys 2416 to determine whether a keystroke was intended, determine whether an input is indicative of resting pressure, support authentication of the input device 2414 for operation with the computing device 2402, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2402. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2410 and computer-readable media 2406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2410. The computing device 2402 may be configured to implement particular instructions and/or functions corresponding to the software and/or hardware modules. Accordingly, implementation of a module that is executable by the computing device 2402 as software may be achieved at least partially in hardware, e.g., through use of computer-readable storage media and/or hardware elements 2410 of the processing system 2404. The instructions and/or functions may be executable/operable by one or more articles of manufacture (for example, one or more computing devices 2402 and/or processing systems 2404) to implement techniques, modules, and examples described herein.

Implementations discussed herein include:

Example 1

A device including: a support component movably attached to the device, the support component being configured to physically support the component in one or more positions relative to an adjacent surface; and at least one hinge that moveably attaches a portion of the support component to the device, the hinge including: a first opening angle range in which resistance to opening of the hinge is provided by a first friction mechanism of the hinge; and a second opening angle range in which resistance to opening of the hinge is provided by both the first friction mechanism and a second friction mechanism of the hinge.

Example 2

A device as described in example 1, wherein the first opening angle range is engageable in response to moving the support between a closed position relative to the device and a first open position relative to the device, and wherein the second opening angle range is engageable in response to opening the support past the first open position.

Example 3

A device as described in one or more of examples 1 or 2, wherein torque required to open the support component with the hinge in the first opening angle range is less than a torque required to open the support component with the hinge in the second opening angle range.

Example 4

A device as described in one or more of examples 1-3, wherein resistance to opening of the hinge in the first opening angle range is less than resistance to opening of the hinge in the second opening angle range.

Example 5

A device as described in one or more of examples 1-4, wherein the second friction mechanism is not engaged with the hinge in the first opening angle range.

Example 6

A device as described in one or more of examples 1-5, wherein the hinge further includes an emergency escape position beyond the second opening angle range.

Example 7

A device as described in one or more of examples 1-6, wherein the device includes a mobile computing device, and the support component is configured to support multiple positions of the mobile computing device relative to the adjacent surface.

Example 8

A device as described in one or more of examples 1-7, wherein the device includes a mobile computing device with a display positioned on a front portion of the computing device, and the support component is configured to support multiple viewing positions of the display relative to an adjacent surface.

Example 9

A hinge including: a primary cam that provides resistance to opening of the hinge over a first opening angle range; and a secondary cam that provides resistance along with the primary cam to opening of the hinge over a second opening angle range.

Example 10

A hinge as described in example 9, wherein opening of the hinge from a closed position to a first open position includes the first opening angle range, and opening of the hinge past the first open position includes the second opening angle range.

Example 11

A hinge as described in one or more of examples 9 or 10, wherein the secondary cam is not engaged with the hinge in the first opening angle range.

Example 12

A hinge as described in one or more of examples 9-11, wherein torque required to open the hinge in the first opening angle range is less than a torque required to open the hinge in the second opening angle range.

Example 13

A hinge as described in one or more of examples 9-12, wherein the hinge includes: a hinge frame; the secondary cam pivotably mounted at least partially within the hinge frame, the secondary cam including a cam ramp with a ramp rise portion; the primary cam pivotably mounted at least partially within the secondary cam, the primary cam including a friction pin; a friction lever pivotably mounted to the hinge frame and rotatably engaged with the friction pin; and a cam follower slidably mounted to the hinge frame adjacent to the secondary cam, the cam follower being positioned to engage with the ramp rise portion of the cam ramp.

Example 14

A hinge as described in one or more of examples 9-13, wherein the hinge includes: a hinge frame; the secondary cam pivotably mounted at least partially within the hinge frame, the secondary cam including a cam ramp with a ramp rise portion; the primary cam pivotably mounted at least partially within the secondary cam, the primary cam including a friction pin; a friction lever pivotably mounted to the hinge frame and rotatably engaged with the friction pin; a cam follower slidably mounted to the hinge frame adjacent to the secondary cam, the cam follower being positioned to engage with the cam rise portion of the hinge ramp, wherein frictional interaction between the friction pin and the friction lever represents at least a portion of the first friction mechanism, and frictional interaction between the cam follower and the ramp rise represents at least a portion of the second friction mechanism.

Example 15

A hinge as described in one or more of examples 9-14, wherein the hinge includes: a hinge frame; the secondary cam pivotably mounted at least partially within the hinge frame, the secondary cam including a cam ramp with a ramp rise portion; the primary cam pivotably mounted at least partially within the secondary cam, the primary cam including a friction pin; a friction lever pivotably mounted to the hinge frame and rotatably engaged with the friction pin; a cam follower slidable mounted to the hinge frame adjacent to the secondary cam, the cam follower being positioned to engage with the ramp rise portion of the cam ramp such that pivoting of the hinge from the first opening angle range to the second opening angle range involves movement of the cam follower up the ramp rise portion of the cam ramp.

Example 16

A hinge as described in one or more of examples 9-15, wherein the hinge includes: a hinge frame; the secondary cam pivotably mounted at least partially within the hinge frame, the secondary cam including a cam ramp with a ramp rise portion; the primary cam pivotably mounted at least partially within the secondary cam, the primary cam including a friction pin; a friction lever pivotably mounted to the hinge frame and rotatably engaged with the friction pin; and a cam follower slidably mounted to the hinge frame adjacent to the secondary cam, the cam follower being positioned to engage with the ramp rise portion of the cam ramp, wherein pivoting of the primary cam from a closed position relative to the hinge frame causes the primary cam to engage with the secondary cam, and further pivoting of the primary cam causes the secondary cam to pivot relative to the hinge frame, wherein frictional interaction between the friction pin and the friction lever during pivoting of the primary cam represents at least a portion of the first friction mechanism, and frictional interaction between the cam follower and the ramp rise during pivoting of the secondary cam represents at least a portion of the second friction mechanism.

Example 17

A hinge including: a hinge frame; a secondary cam pivotably mounted at least partially within the hinge frame, the secondary cam including a cam ramp with a ramp stop; a primary cam pivotably mounted at least partially within the secondary cam, the primary cam including a friction pin; a friction lever pivotably mounted to the hinge frame and rotatably engaged with the friction pin; and a cam follower mounted to the hinge frame adjacent to the secondary cam, the cam follower being positioned such that pivoting of the hinge from a closed position to a particular open position causes the cam follower to engage with the ramp stop and resist further opening of the hinge.

Example 18

A hinge as described in example 17, wherein frictional interaction between the friction pin and the friction lever provides resistance to pivoting of the primary cam relative to the hinge frame.

Example 19

A hinge as described in one or more of examples 17 or 18, wherein the primary cam includes a component mount for mounting an external component to the hinge.

Example 20

A hinge as described in one or more of examples 17-19, wherein opening of the hinge past the particular open position represents an emergency release position for the hinge.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An electronic device comprising:
   a chassis that supports a display;
   a support component; and
   a hinge rotatably attaching the support component to the chassis, the hinge comprising:
      a hinge frame secured to the chassis,
      a primary cam positioned relative to the hinge frame and the support component, the primary cam including a friction pin that provides resistance to opening of the hinge over a first opening angle range, and
      a secondary cam positioned at least partially within the hinge frame, the secondary cam providing resistance along with the primary cam to opening of the hinge over a second opening angle range.

2. The electronic device as recited in claim 1, wherein opening of the hinge from a closed position to a first open position comprises the first opening angle range, and opening of the hinge past the first open position comprises the second opening angle range.

3. The electronic device as recited in claim 1, wherein the secondary cam is not engaged with the hinge in the first opening angle range.

4. The electronic device as recited in claim 1, wherein torque required to open the hinge in the first opening angle range is less than other torque required to open the hinge in the second opening angle range.

5. The electronic device as recited in claim 1, wherein the secondary cam includes a cam ramp with a ramp rise portion and the hinge further comprises:
   a friction lever pivotably mounted to the hinge frame and rotatably engaged with the friction pin; and
   a cam follower slidably mounted to the hinge frame adjacent to the secondary cam, the cam follower being positioned to engage with the ramp rise portion of the cam ramp.

6. The electronic device as recited in claim 5, wherein frictional interaction between the friction pin and the friction lever represents at least a portion of a first friction mechanism, and frictional interaction between the cam follower and the ramp rise portion represents at least a portion of a second friction mechanism.

7. The electronic device as recited in claim 1, wherein the secondary cam includes a cam ramp with a ramp rise portion and the hinge further comprises:
   a friction lever pivotably mounted to the hinge frame and rotatably engaged with the friction pin; and
   a cam follower slidably mounted to the hinge frame adjacent to the secondary cam, the cam follower being positioned to engage with the ramp rise portion of the cam ramp such that pivoting of the hinge from the first opening angle range to the second opening angle range involves movement of the cam follower up the ramp rise portion of the cam ramp.

8. The electronic device as recited in claim 1, wherein the secondary cam includes a cam ramp with a ramp rise portion and the hinge further comprises:
   a friction lever pivotably mounted to the hinge frame and rotatably engaged with the friction pin; and
   a cam follower slidably mounted to the hinge frame adjacent to the secondary cam, the cam follower being positioned to engage with the ramp rise portion of the cam ramp,
   wherein pivoting of the primary cam from a closed position relative to the hinge frame causes the primary cam to engage with the secondary cam, and further pivoting of the primary cam causes the secondary cam to pivot relative to the hinge frame, wherein frictional interaction between the friction pin and the friction lever during pivoting of the primary cam represents at least a portion of a first friction mechanism, and frictional interaction between the cam follower and the ramp rise during pivoting of the secondary cam represents at least a portion of a second friction mechanism.

9. A hinge comprising:

a hinge frame;

a secondary cam pivotably mounted at least partially within the hinge frame, the secondary cam including a cam ramp with a ramp stop;

a primary cam pivotably mounted at least partially within the hinge frame, the primary cam including a friction pin;

a friction lever pivotably mounted to the hinge frame and rotatably engaged with the friction pin; and a cam follower mounted to the hinge frame adjacent to the secondary cam, the cam follower being positioned such that pivoting of the hinge from a closed position to a particular open position causes the cam follower to engage with the ramp stop and resist further opening of the hinge.

10. A hinge as recited in claim 9, wherein frictional interaction between the friction pin and the friction lever provides resistance to pivoting of the primary cam relative to the hinge frame.

11. A hinge as recited in claim 9, wherein the primary cam includes a component mount for mounting an external component to the hinge.

12. A hinge as recited in claim 9, wherein opening of the hinge past the particular open position represents an emergency release position for the hinge.

13. A hinge comprising:

a hinge frame;

a secondary cam pivotably mounted at least partially within the hinge frame, the secondary cam including a cam ramp with a ramp rise;

a primary cam pivotably mounted at least partially within the hinge frame, the primary cam including a friction pin;

a friction lever pivotably mounted to the hinge frame and rotatably engaged with the friction pin, the hinge having a first opening angle range where resistance to opening of the hinge is primarily based on interaction between the friction lever and the friction pin; and a cam follower mounted to the hinge frame adjacent to the secondary cam, the cam follower being positioned such that pivoting of the hinge from a closed position to a particular open position causes the cam follower to engage with the ramp rise and resist further opening of the hinge, the hinge having a second opening angle range where interaction between the cam follower and the ramp rise contributes to resistance to opening of the hinge.

14. A hinge as recited in claim 13, wherein a torque required to open the hinge in the first opening angle range is less than a torque required to open the hinge in the second opening angle range.

15. A hinge as recited in claim 13, wherein transitioning the hinge from the first opening angle range to the second opening angle range causes an increase in frictional resistance to opening of the hinge.

16. A hinge as recited in claim 13, wherein opening of the hinge from a closed position to a first open position comprises the first opening angle range, and opening of the hinge past the first open position comprises the second opening angle range.

17. A hinge as recited in claim 13, wherein opening of the hinge that causes the cam follower to move past a top portion of the ramp rise represents an emergency release position for the hinge.

18. A hinge as recited in claim 13, wherein the cam follower is slidably mounted within a channel in the hinge frame such that sliding movement of the cam follower within the channel is co-directional with a longitudinal axis of the hinge frame.

19. A hinge as recited in claim 13, further comprising a channel in the hinge frame in which the cam follower is mounted, and a spring positioned within the channel which exerts pressure on the cam follower to press the cam follower against the cam ramp.

20. A hinge as recited in claim 13, further comprising a sheath that is pivotably attached to the hinge frame, wherein the friction lever is slidably engaged within the sheath.

* * * * *